US008150572B2

(12) United States Patent
Yamamoto et al.

(10) Patent No.: US 8,150,572 B2
(45) Date of Patent: Apr. 3, 2012

(54) ELECTRIC POWER GENERATION CONTROL APPARATUS FOR VEHICLE AND ELECTRIC POWER GENERATION CONTROL SYSTEM EQUIPPED WITH THE APPARATUS

(75) Inventors: Hiroyoshi Yamamoto, Nagoya (JP); Akira Kato, Kani (JP)

(73) Assignee: Denso Corporation, Kariya (JP)

( * ) Notice: Subject to any disclaimer, the term of this patent is extended or adjusted under 35 U.S.C. 154(b) by 959 days.

(21) Appl. No.: 12/141,299

(22) Filed: Jun. 18, 2008

(65) Prior Publication Data
US 2008/0319595 A1 Dec. 25, 2008

(30) Foreign Application Priority Data

Jun. 20, 2007 (JP) ................................. 2007-162343

(51) Int. Cl.
*B60L 9/00* (2006.01)
*G06F 7/00* (2006.01)
(52) U.S. Cl. .................. 701/22; 701/1; 701/51; 701/69; 701/123
(58) Field of Classification Search .................. None
See application file for complete search history.

(56) References Cited

U.S. PATENT DOCUMENTS

| 5,845,221 | A | * | 12/1998 | Hosokawa et al. | 701/36 |
|---|---|---|---|---|---|
| 6,127,741 | A | * | 10/2000 | Matsuda et al. | 307/36 |
| 6,215,283 | B1 | | 4/2001 | Desroches et al. | |
| 6,335,610 | B1 | | 1/2002 | Winstead | |
| 6,700,386 | B2 | * | 3/2004 | Egami | 324/503 |
| 6,908,162 | B2 | * | 6/2005 | Obayashi et al. | 303/152 |
| 7,173,347 | B2 | | 2/2007 | Tani et al. | |
| 2004/0164616 | A1 | | 8/2004 | Obayashi et al. | |
| 2004/0251743 | A1 | * | 12/2004 | Sadowski et al. | 307/10.1 |
| 2006/0276937 | A1 | | 12/2006 | Yamashita | |

FOREIGN PATENT DOCUMENTS

| JP | 08-322107 | 12/1996 |
|---|---|---|
| JP | 08-331772 | 12/1996 |
| JP | 09-093717 | 4/1997 |
| JP | 2000-188802 | 7/2000 |
| JP | 2000-512120 | 9/2000 |

(Continued)

OTHER PUBLICATIONS

Japanese Office Action dated May 8, 2009, issued in corresponding Japanese Application No. 2007-162343, with English translation.

*Primary Examiner* — Khoi Tran
*Assistant Examiner* — Ian Jen
(74) *Attorney, Agent, or Firm* — Nixon & Vanderhye P.C.

(57) ABSTRACT

An electric power generation control apparatus mounted to a motor vehicle predicts an operational point of an internal combustion engine in the future based on driving path information supplied from a navigation system mounted to the motor vehicle. The apparatus further predicts an increased amount of fuel consumption which is caused by electric power generation of an alternator based on the predicted operational point of the internal combustion engine. The apparatus sets a reference value of an electric power economy index which is an amount of fuel consumption per electric power generation. On driving the motor vehicle on a path, the apparatus sequentially predicts the operational point of the internal combustion engine, and controls the alternator so that the actual electric power economy index becomes equal to the reference value based on the operational point of the internal combustion engine predicted.

12 Claims, 17 Drawing Sheets

FOREIGN PATENT DOCUMENTS

| | | |
|---|---|---|
| JP | 2001-314002 | 11/2001 |
| JP | 2002-118905 | 4/2002 |
| JP | 2003-095042 | 4/2003 |
| JP | 2004-194495 | 7/2004 |
| JP | 2004-249900 | 9/2004 |
| JP | 2004-260908 | 9/2004 |
| JP | 2005-278343 | 10/2005 |
| JP | 2007-049778 | 2/2007 |

* cited by examiner

FIG. 10
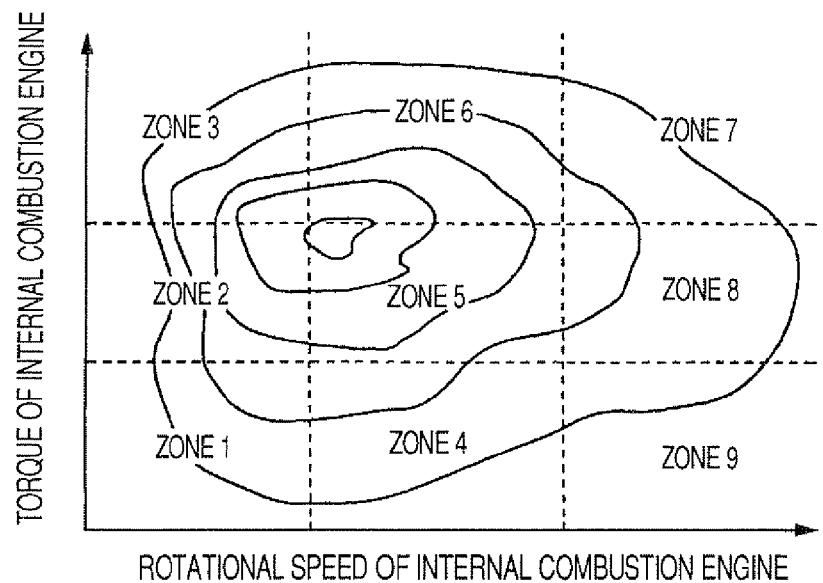
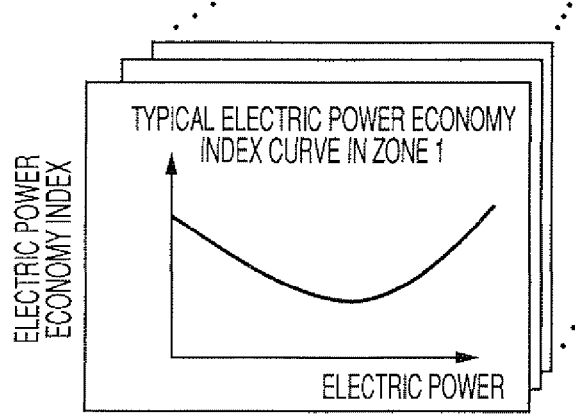

ELECTRIC POWER GENERATION CONTROL APPARATUS FOR VEHICLE AND ELECTRIC POWER GENERATION CONTROL SYSTEM EQUIPPED WITH THE APPARATUS

CROSS-REFERENCE TO RELATED APPLICATION

This application is related to and claims priority from Japanese Patent Application No. 2007-162343 filed on Jun. 20, 2007, the contents of which are hereby incorporated by reference.

BACKGROUND OF THE INVENTION

1. Field of the Invention

The present invention relates to an electric power generation control apparatus and an electric power generation control system equipped with this apparatus. The electric power generation control apparatus is capable of controlling the amount of generated electric power of an electric power generation means. The electric power generation means generates the electric power by rotational power or force supplied through an output shaft of an internal combustion engine of a motor vehicle. The present invention also relates to a navigation system, mounted to a motor vehicle, which operates accompanied with the electric power generation control apparatus.

2. Description of the Related Art

There has been proposed the technique disclosed by the Japanese patent laid open publication No. JP 2003-95042. The technique disclosed in JP 2003-95042 sets a voltage of electric power to be generated based on information relating to a driving path or road transferred from a navigation system. In a concrete example, when the navigation system mounted to a motor vehicle provides the information about an expressway on which the motor vehicle would drive in the future after passing through an urban area, the electric power generation control apparatus receives the information, and sets the voltage of electric power generation in order to allow the battery to discharge a specified amount of electric power while the motor vehicle drives in the urban area, wherein this specific amount of electric power would be charged when the motor vehicle would drive on an expressway in the future. This enables the amount of generated electrical power to be decreased while the motor vehicle drives in the urban area. It is thereby possible to decrease the total fuel consumption of the motor vehicle.

In general, there is no simple relationship between the voltage of electric power generation in a vehicular alternator (or an engine-driven generator) and the amount of fuel injected into cylinders of an internal combustion engine of the motor vehicle. Accordingly, it is difficult to correctly know or predict an increased amount of fuel consumption caused by the electrical power generation of the vehicle alternator based on the voltage set by the electric power generation control apparatus. In other words, it is difficult to correctly judge how much the fuel consumption has increased accompanied with the electrical power generation of the vehicle alternator when the electric power generation control apparatus sets the voltage of electric power to be generated based on the information of the driving path or road.

The information is not accurate enough for the electric power control apparatus to effectively decrease the amount of fuel consumption caused by the generation of electrical power. There is only a rough anticipation that the electric power generation control apparatus merely decreases the increased amount of fuel consumption accompanied with the electrical power generation.

SUMMARY OF THE INVENTION

It is an object of the present invention to provide an electrical power generation control apparatus capable of efficiently decreasing an increased amount of fuel consumption of an internal combustion engine of a motor vehicle when controlling an amount of generated electric power of an electric power generation means by rotational power or force supplied through an output shaft of the internal combustion engine. Further, it is another object of the present invention to provide an electrical power generation control system equipped with the above electric power generation control apparatus, and to further provide an operating navigation system accompanied with the electric power generation control apparatus.

To achieve the above purposes, the present invention provides the electric power generation control apparatus for controlling the amount of generated electric power of the electric power generation means which generates electric power by rotational force supplied through the output shaft of the internal combustion engine of the motor vehicle. The electric power generation control apparatus according to the present invention has an electric power economy index calculation means, an electric power generation processing means, an obtaining means, and a setting means.

The electric power economy index calculation means calculates an electric power economy index based on a currently operational state of the internal combustion engine. In particular, the electric power economy index is defined as an increased amount of the fuel consumption of the internal combustion engine per amount of generated electric power of the electric power generation means.

The electric power generation processing means controls the operation of the electric power generation means in order to control an actual value of the electric power economy index caused by the electric power generation means based on a reference value.

The obtaining means obtains driving path information about a coming driving path on which the motor vehicle would drive in the future.

The setting means sets the reference value based on the driving path information.

According to the present invention, the electric power economy index is calculated based on the current operational state of the internal combustion engine. This can correctly obtain the increased amount of fuel consumption caused by the electric power generation of the electric power generation means, for example, an alternator of the motor vehicle. In particular, because the reference value for the electric power economy index is set based on the driving path information, it is possible to predict the future electric power economy index and to obtain the optimum reference value. Further, it is possible to control the optimum electric power generation at the present time under the control to predict the future electric power economy index by controlling the actual electric power economy index based on the reference value while considering the electric power economy index calculated based on the current operational state of the internal combustion engine. It is therefore possible to further decrease the increased amount of fuel consumption of the internal combustion engine.

In accordance with another aspect of the present invention, there is provided an electric power generation control system equipped with the electric power generation control apparatus described above and a navigation system. The navigation system has a driving path setting means, a total fuel consumption amount prediction means, and an output means. The driving path setting means sets a driving path of the motor vehicle based on a destination to be input. The total fuel consumption amount prediction means predicts the amount of fuel consumption of the internal combustion engine including an additional amount of fuel consumption to be increased by the electric power generation of the electric power generation means for various driving paths to be set. The output means outputs the driving path having the minimum amount of fuel consumption predicted.

According to the present invention, because the driving path of the minimum fuel consumption is output to the outside of the system through the output means such as a display unit or an acoustic device, the driver of the motor vehicle knows the information about the driving path of the minimum fuel consumption in the various paths to the destination.

Further, the electric charging means is mounted to the motor vehicle. The electric charging means charges electric power generated by the electric power generation means. The total fuel consumption amount prediction means has an electric power consumption amount prediction means, an operational state prediction means, an electric power economy index prediction means, and a means for predicting a minimum amount of fuel consumption of the internal combustion engine. The electric power consumption amount prediction means predicts the amount of electric power consumption in the future to be supplied from the electric charging means until the motor vehicle arrives at the destination. The operational state prediction means predicts the operational state of the internal combustion engine in the future based on the driving path to be set. The electric power economy index prediction means predicts the electric power economy index for various electric power generation amounts based on the change of the operational state of the internal combustion engine by setting various electric power generation amounts of the electric power generation means under the predicted operational state of the internal combustion engine. The means predicts the minimum amount of fuel consumption of the internal combustion engine. This minimum amount of fuel consumption includes an increased amount of electric power generated by the electric power generation means based on the predicted amount of electric power consumption and the calculated electric power economy index for various driving paths to be set within the allowable range of a SOC (State of Charge as a charged amount) of the electric charging means.

In accordance with another aspect of the present invention, there is provided a navigation system mounted to the motor vehicle. The motor vehicle is equipped with electric power generation means for generating electric power by the rotational force supplied through the output shaft of the internal combustion engine of the motor vehicle. The navigation system has a driving path setting means, a total fuel consumption amount prediction means, and an output means. The driving path setting means sets a driving path of the motor vehicle based on a destination to be input. The total fuel consumption amount prediction means predicts an amount of fuel consumption of the internal combustion engine including an additional amount of fuel consumption to be increased by the electric power generation of the electric power generation means for various driving paths to be set. The output means outputs the driving path having a minimum amount of fuel consumption predicted.

According to the present invention, the driver of the motor vehicle can get the information regarding the driving path having the minimum fuel consumption in the various paths to the destination through the output means such as a display unit or an acoustic device.

BRIEF DESCRIPTION OF THE DRAWINGS

A preferred, non-limiting embodiment of the present invention will be described by way of example with reference to the accompanying drawings, in which:

FIG. 10 is a map to be used of calculating an increased amount of fuel consumption of the internal combustion engine per electrical power amount according to a third embodiment;

DETAILED DESCRIPTION OF THE PREFERRED EMBODIMENTS

Figure 1:
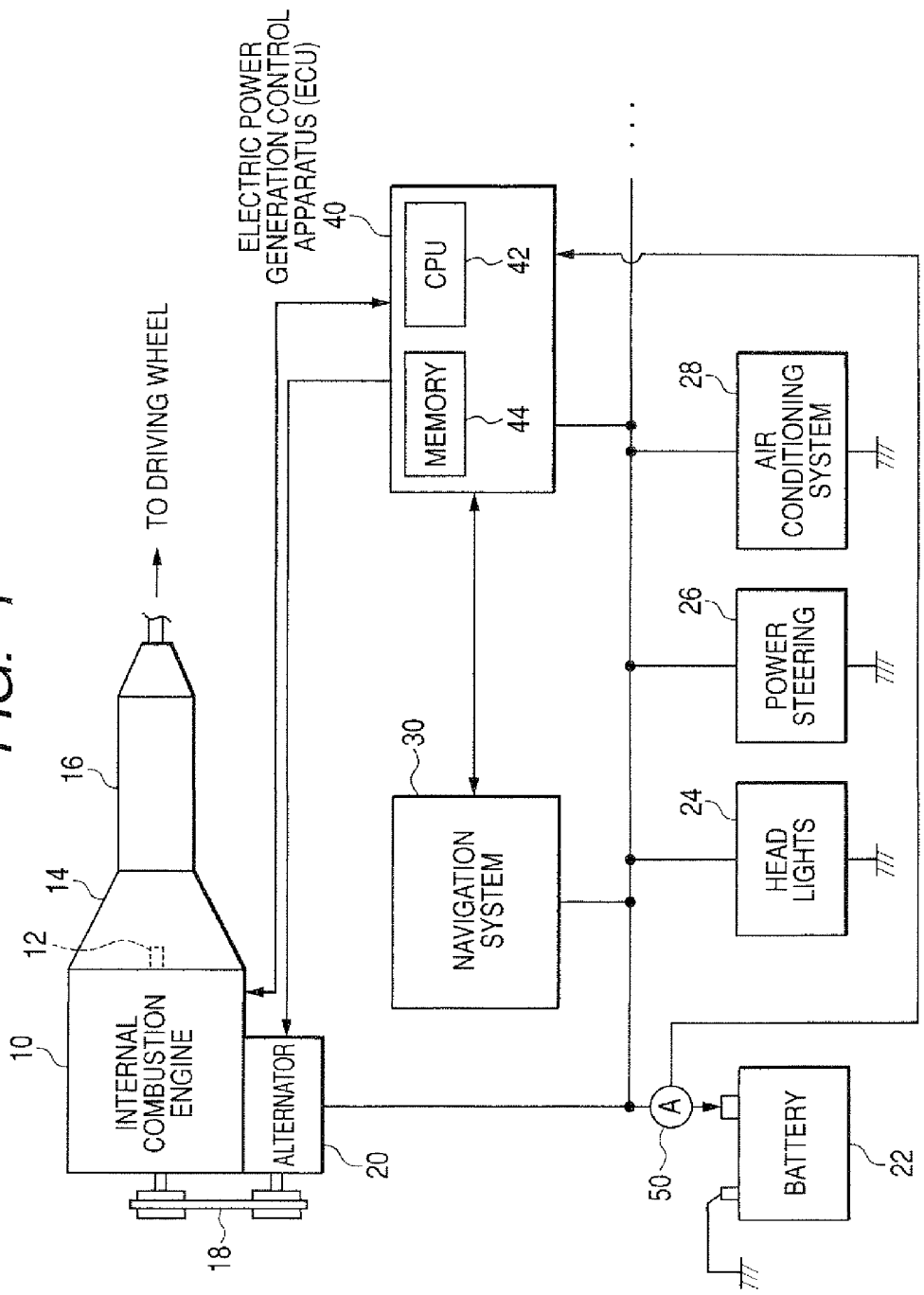
FIG. 1 is a schematic view showing an entire of an electric power generation control system equipped with an electric power generation control apparatus according to a first embodiment of the present invention.

Hereinafter, various embodiments of the present invention will be described with reference to the accompanying drawings. In the following description of the various embodiments, like reference characters or numerals designate like or equivalent component parts throughout the diagrams.

First Embodiment

A description will be given of the electric power generation control apparatus and the control system mounted to a motor vehicle which is equipped with an automatic transmission with reference to FIG. 1 to FIGS. 7A to 7G.

FIG. 1 is a schematic view showing the entire structure of an electric power generation control system. The system is equipped with an electric power generation control apparatus 40 according to the first embodiment.

As shown in FIG. 1, an output shaft 12 of an internal combustion engine 10 is engaged with an automatic transmission 16 through a torque converter 14. The output torque of the internal combustion engine 10 is transmitted to driving wheels of the motor vehicle through the torque converter 14 and the automatic transmission 16. Both a pulley 18 and a vehicular alternator or an engine-driven generator (as an electric power generation means) 20 are fixed to the output shaft 12.

Electric power generated by the alternator 20 is transmitted to and accumulated in a battery (as an electric charging means) 22. The battery 22 is capable of supplying the electric power to plural on-vehicle electrical loads. For example, there are head lights 24, power steering 26, an air conditioner system 28, a navigation system 30, and the electric power generation control apparatus 40.

The electric power generation control apparatus 40 mainly controls the internal combustion engine 10 and the alternator 20. The electric power generation control apparatus 40 is comprised of a central processing unit (CPU) 42, a memory 44, and the like in an electrical control unit (ECU).

The electric power generation control apparatus 40 receives detection signals transferred from various types of sensors such as a current sensor 50 in order to detect the operation state of the internal combustion engine 10. The current sensor 50 detects a current flowing into/from the battery 22. The electric power generation control apparatus 40 generates various types of control signals which are transferred to the internal combustion engine 10 and the alternator 20.

Figure 2:
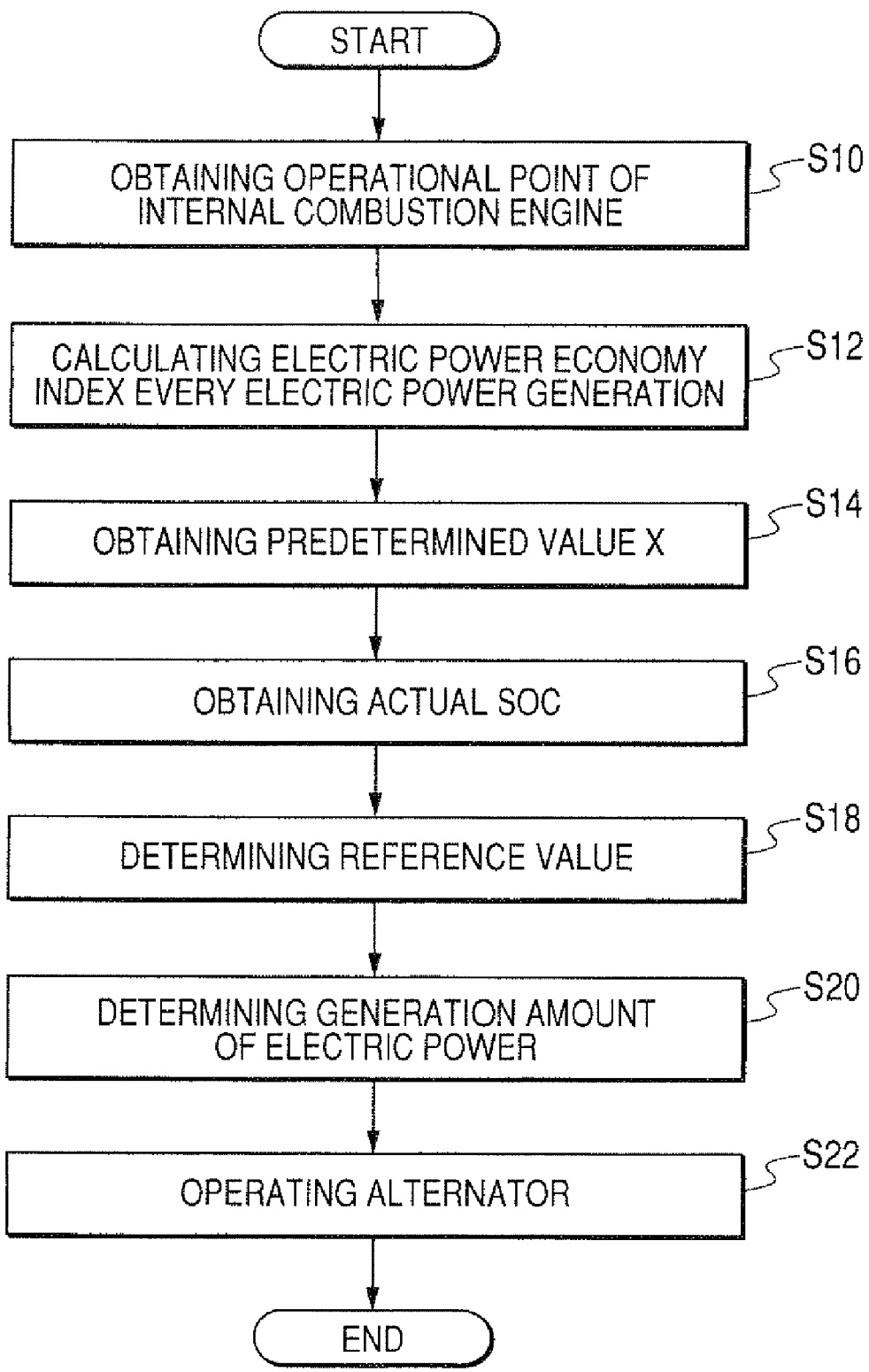
FIG. 2 is a flow chart showing a series of processes performed by the electric power generation control apparatus for controlling electric power generation according to the first embodiment.

FIG. 2 is a flow chart showing the operation processes of the electric power generation control apparatus 40 according to the first embodiment. In particular, FIG. 2 shows the operation processes for controlling the electrical power generation of the alternator 20. The electric power generation control apparatus 40 repeatedly performs the processes shown in FIG. 2 at a predetermined cycle.

At step S10 in the operation processes shown in FIG. 2, the electric power generation control apparatus 40 firstly gets a currently operational point of the internal combustion engine 10. This operational point is defined by the rotational speed and torque of the output shaft 12 of the internal combustion engine 10.

At step S12, the electric power generation control apparatus 40 calculates an increased amount of fuel consumption of the internal combustion engine 10 per amount of generated electric power of the alternator 20 for various electric power generation amounts of the alternator 20. This ratio will be referred to as the "electric power economy index" simply. The process at step S12 is performed using alternator efficiency maps shown in FIG. 3A to FIG. 3C.

Figure 3A:
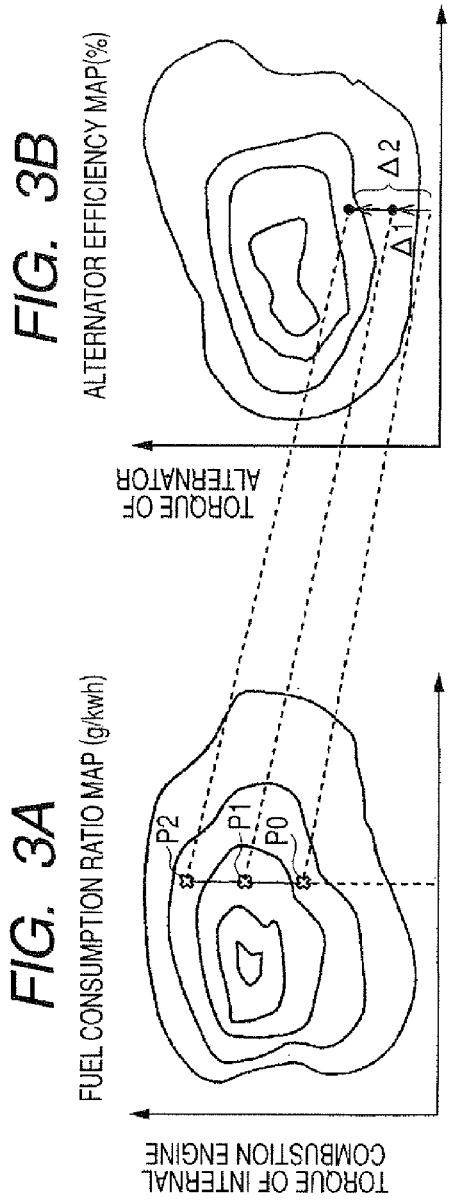
FIGS. 3A to 3D shows detailed contents indicating the operation shown in FIG. 2.
Figure 3B:
Figure 3C:
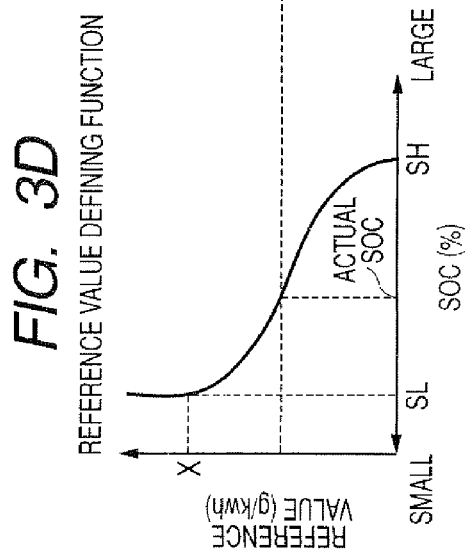

FIG. 3A to FIG. 3C show the process of calculating the electric power economy index. FIG. 3A shows a map for determining the relationship between the rotational speed and the torque (operational point) of the output shaft 12 of the internal combustion engine 10. This map shown in FIG. 3A is also stored in the memory 44 in the electric power generation control apparatus 40 shown in FIG. 1. Each curve in FIG. 5A indicates an equal amount ratio of fuel consumption.

FIG. 3B is a map for showing an operational efficiency of the alternator 20. This map shown in FIG. 3B is also stored in the memory 44 in the electric power generation control apparatus 40. Each curve in FIG. 3B indicates an equal operational efficiency of the alternator 20. This operational efficiency of the alternator 20 means the ratio (percentage %) of amount of generated electric power in the output power (kW) which is determined based on the rotational speed and torque of the alternator 20.

In general, the driver of the motor vehicle feels a sense of incompatibility with driving when the rotational speed of the output shaft 12 of the internal combustion engine 10 is changed by a negative torque whose magnitude corresponds to the amount of electric power generation of the alternator 20. In order to avoid such a sense of incompatibility with driving of the motor vehicle, the electric power generation control apparatus 40 according to the first embodiment controls the amount of generated electric power under the control to maintain the rotational speed of the output shaft 12 of the internal combustion engine 10. In this case, the electric power generation control apparatus 40 also changes the torque of the alternator 20 under the control to maintain a predetermined ratio between the rotational speed of the alternator 20 and the rotational speed of the internal combustion engine 10. The efficiency of the alternator 20 is thereby calculated using the maps shown in FIG. 3A and FIG. 3B when the torque of the alternator 20 is set under the control to maintain the rotational speed of the alternator 20. The electric power generation control apparatus 40 determines the amount of electric power generated by the alternator 20 based on this efficiency of the alternator 20 calculated above using the map.

In a concrete example, the electric power generation control apparatus 40 calculates the amount of generated electric power of the alternator 20 when the torque of the alternator 20 is $\Delta 1$ and $\Delta 2$ shown in FIG. 3B. The electric power generation control apparatus 40 then calculates the operational points which are determined by the increased torques P1 and P2 of the internal combustion engine 10. Those torques P1 and P2 shown in FIG. 3A correspond to the torques $\Delta 1$ and $\Delta 2$ of the alternator 20 shown in FIG. 3B. The electric power generation control apparatus 40 also calculates the fuel consumption ratio of the internal combustion engine 10 at the currently operational point P0 and the calculated operational points P1 and P2. The electric power generation control apparatus 40 then calculates the difference of the fuel consumption ratio at the operational points P1, P1, and P0, and calculates the increased amount of fuel consumption of the internal combustion engine 10 per hour.

Figure 5A:
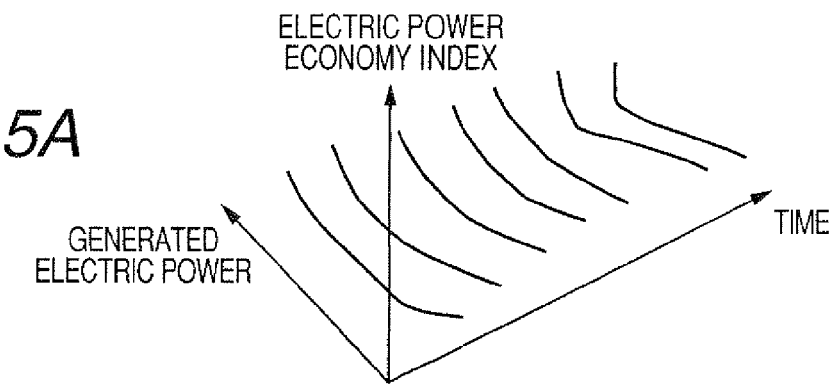
FIGS. 5A to 5D show the setting operation of the predetermined value X in detail, as shown in FIG. 4.
Figure 5B:
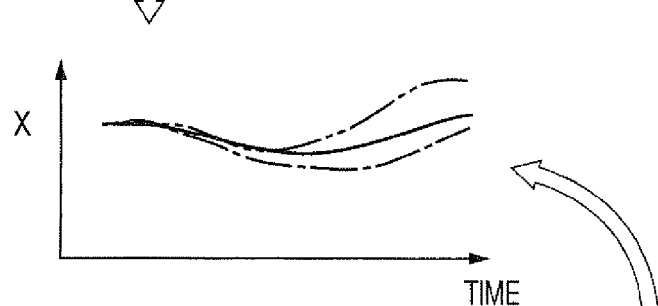

The electric power generation control apparatus 40 calculates the electric power economy index as the ratio of the amount of generated electric power of the alternator 20 calculated using the alternator efficiency map shown in FIG. 5B and the increased amount of fuel consumption of the internal combustion engine 10.

FIG. 3C shows an example of the calculation result of the amount of generated electric power of the alternator 20 and the electric power economy index to be calculated when the torque of the alternator 20 takes various values.

Returning to the flow chart shown in FIG. 2, the electric power generation control apparatus 40 calculates a predetermined value X at step S14. The predetermined value X is used for determining a function (reference value determining function). The electric power generation control apparatus 40 calculates an actual amount of generated electric power of the alternator 20 using this function based on the relationship between the above ratio. The detailed calculation process of the predetermined value X will be explained later.

Figure 3D:
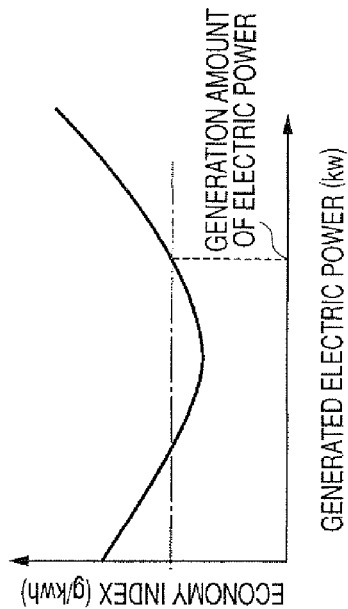

FIG. 3D shows the above reference value determining function. As shown in FIG. 3D, this reference value determining function determines the relationship between a SOC (a State Of Charge, as a charged amount) of the battery 22 and the reference value of the electric power economy index. In particular, as shown in FIG. 3D, the reference value determining function is made so that the reference value has not less than the maximum value of the electric power economy index when the amount of generated electric power of the alternator 20 is set to the maximum value at an allowable minimum value SL of the SOC of the battery 22. In addition, as shown in FIG. 3D, the reference value determining function is so set that the reference value is not more than zero at the allowable maximum value SH.

Specifically, in the first embodiment, the reference value determining function is defined using the following cubic function.

$$\text{Reference value } X' = X[-\{(SOC-SM)^3/(2 \cdot \delta^3)\} + \frac{1}{2}],$$

where SM is a medium value between an allowable maximum value SH and an allowable minimum value SL, and a predetermined value δ is a half value of a difference of the allowable maximum value SH and the allowable minimum value SL.

It is possible to adjust the reference value determining function by changing the predetermined value X.

At step S14 shown in FIG. 2, the predetermined value X is obtained by the process which will be explained later.

At step S16, the electric power generation control apparatus 40 obtains an actual SOC of the battery 22. It is possible that this actual SOC is obtained as a net charge amount of the battery 22 calculated based on the currents flowing into/flowing out from the battery 22 detected by the current sensor 50.

At step S18, the electric power generation control apparatus 40 determines the reference value X using the reference value determining function based on the actual SOC calculated in step S16. As shown in FIG. 3D, the reference value X can be set by inputting the actual SOC into the reference value determining function which is determined based on the predetermined value X.

At step S20 shown in FIG. 2, the electric power generation control apparatus 40 calculates the amount of generated electric power of the alternator 20. The first embodiment uses, as the amount of generated electric power of the alternator 20, the maximum amount of electric power within the range where the electric power economy index is not more than the reference value. In order to maintain the rotational speed of the output shaft of the internal combustion engine, which tends to decrease by the electric power generation of the alternator 20, this amount of generated electric power is used or referred to control various control signals for controlling the operation of the internal combustion engine 10.

At step S22 shown in FIG. 2, the electric power generation control apparatus 40 controls the alternator 20 so that the alternator 20 generates the amount of generated electric power determined at step S20.

Figure 4:
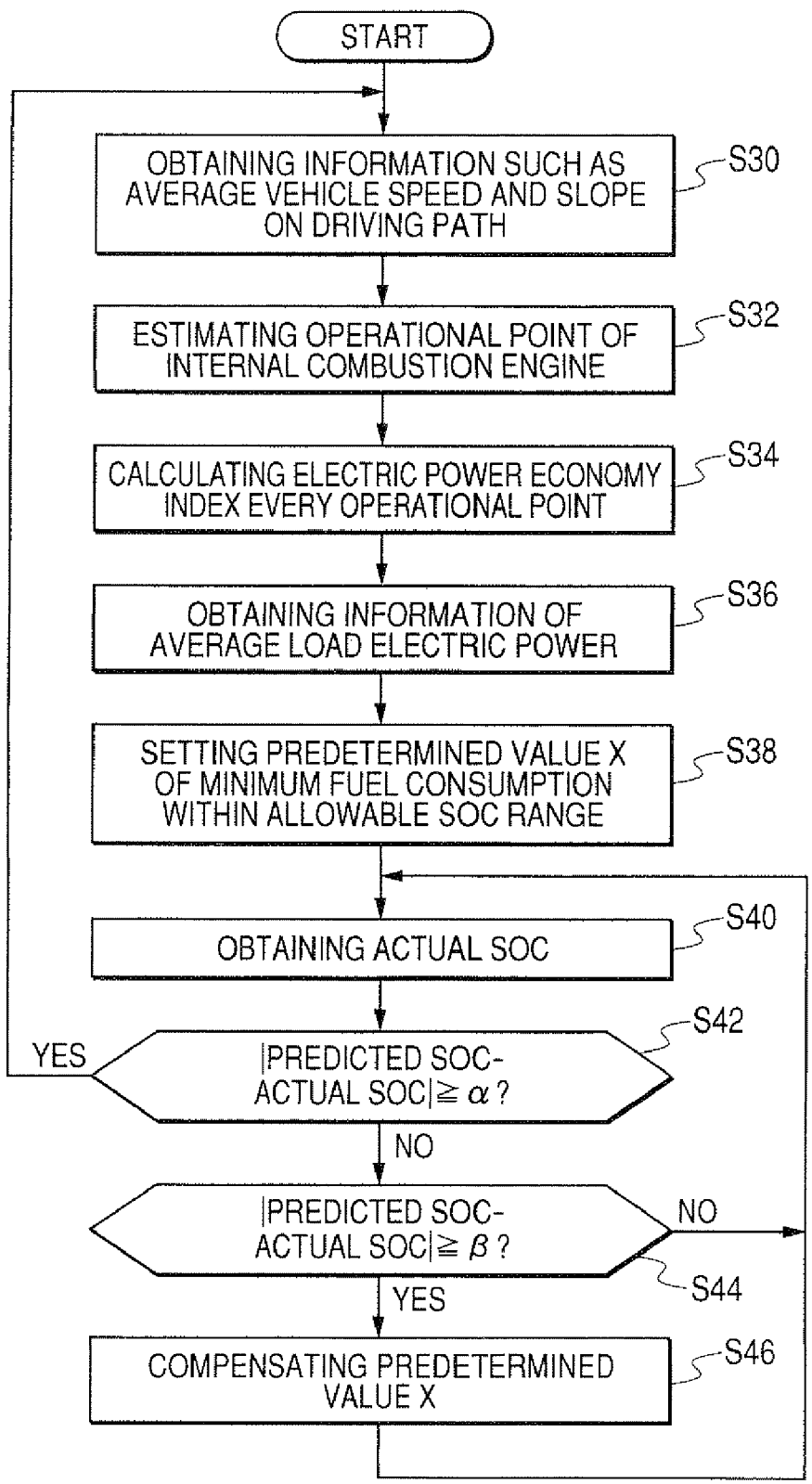
FIG. 4 is a flow chart of a process of setting a predetermined value X used in the electrical power generation control operation according to the first embodiment.

Next, the calculation process of the predetermined value X will now be explained with reference to FIG. 4. FIG. 4 is a flow chart showing the calculation process of setting the predetermined value X.

The reference value determining function is defined using this predetermined value X. The electric power generation control apparatus 40 repeatedly performs this calculation process at a predetermined cycle.

In the series of this calculation process shown in FIG. 4, the navigation system 30 gets an average driving speed of the vehicle (or the vehicle average speed) on a path (or a rode), slope information and the like at step S30. This navigation system 30 initiates this operation after the driver of the vehicle turns on the navigation system 30 and inputs a destination into the navigation system 30. That is, when the driver inputs the destination information into the navigation system 30, the navigation system 30 thereby determines the driving route. The navigation system 30 thereby searches the slope information of the driving path in the driving route. The navigation system 30 approximately calculates a rough vehicle speed according to the paths in the driving route. For example, it can be predicted that the average driving speed of the vehicle on an express way is set to 100 km/h, and the average driving speed on an ordinary path is set to 30 km/h.

For example, it is possible for the electric power generation control apparatus 40 to predict the average vehicle speed of the vehicle on the driving path (or driving road) with high accuracy based on traffic jam information and path work information transferred from the navigation system 30. It is further possible to get more detailed information regarding the condition of the driving path transferred from a preceding vehicle which is driving on the path (or road) in front of the vehicle when both the vehicles are equipped with the navigation system with communication function.

It is acceptable to further add various parameters for changing the torque of the vehicle such as environmental parameters of objects on the driving path as the information of the condition of the driving path. For example, it is possible to add a wind velocity and the direction of the wind which are important parameters to determine the magnitude of air resistance to the vehicle.

At step S32 shown in FIG. 4, the electric power generation control apparatus 40 estimates the operational point of the internal combustion engine 10 of the motor vehicle on the driving path. For example, this estimation can be performed using a map which determines the relationship between the average vehicle speed, the slope of the driving path, and the operation point of the internal combustion engine 10.

At step S34 shown in FIG. 4, the electric power generation control apparatus 40 calculates the electric power economy index for various operational points of the internal combustion engine 10 by the calculation process in step S12 shown in FIG. 2.

At step S36 shown in FIG. 4, the electric power generation control apparatus 40 obtains average load electric power information. This average load electric power information is an average value of electric power consumption of the battery 22 per predetermined period of time. For example, it is possible to use an average value during the period of time counted from the start of the internal combustion engine 10, or to use an average value during the period of time counted from the start of the internal combustion engine 10 to the stop of the internal combustion engine 10. This average value includes the driver's tendency to drive the motor vehicle and to operate various electrical devices mounted to the vehicle. For example, the average value becomes large when the driver of the motor vehicle tends to use electrical devices mounted to the vehicles.

At step S38, the electric power generation control apparatus 40 calculates the predetermined value X in order to decrease the fuel consumption amount to the minimum value within the allowable SOC range.

Figure 5C:
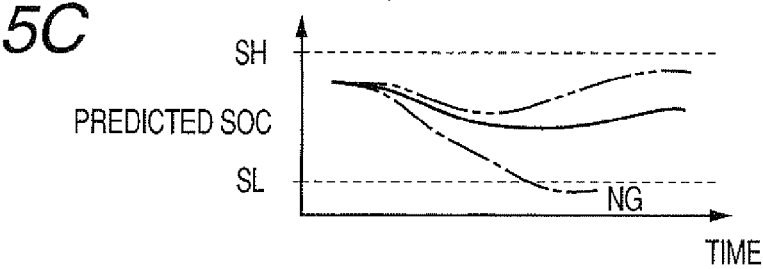
Figure 5D:
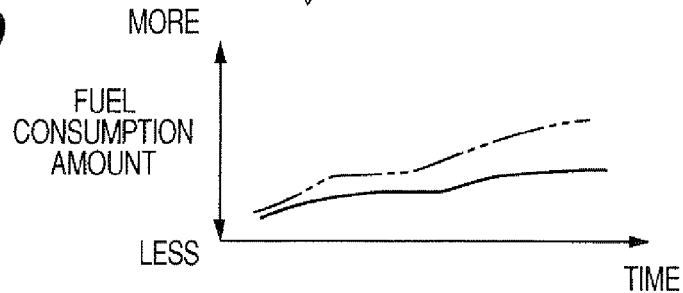

As shown in FIG. 5B, various predetermined values X are prepared. Next, as shown in FIG. 5C, the electric power generation control apparatus 40 predicts the SOC corresponding to each predetermined value X. The electric power generation control apparatus 40 selects the predetermined value X which can set the minimum fuel consumption in the predicted SOC within the allowable range. It is desirable that the SOC becomes the medium value SM. In the case shown in FIG. 5C, the solid line indicates the predicted SOC of the minimum fuel consumption At step S40, the electric power generation control apparatus 40 obtains the actual SOC. At step S42, the electric power generation control apparatus 40 judges whether or not an absolute value of the difference between the predicted SOC and the actual SOC is not less than a predetermined value $\alpha$. This judgment evaluates the validity of the predetermined value X obtained at step S38.

That is, when the absolute value of the difference of the predicted SOC value and the actual SOC value is large, it is possible for the predicted operational point to become separated from the actual operational point of the internal combustion engine 10 on the driving path. This would cause the predetermined value X from the optimum value corresponding to the minimum fuel consumption of the internal combustion engine 10. Therefore when the predetermined value X is not less than the predetermined value $\alpha$, the operation flow returns to step S30.

On the other hand, when the predetermined value X is less than the predetermined value $\alpha$, the operation flow progresses into step S44.

At step S44, the electric power generation control apparatus 40 judges whether or not the absolute value of the difference of the predicted SOC value and the actual SOC value is not less than the predetermined value $\beta$. This judgment is another process of evaluating the validity for the predetermined value X. The predetermined value $\beta$ is a smaller value than the predetermined value $\alpha$. The predetermined value $\beta$ is set to the value capable of decreasing the absolute value of the difference of the predicted SOC value and the actual SOC value when the predetermined value X is slightly changed.

At step S44, it is judged that the predetermined value X is not less than the predetermined value $\beta$, the operation flow goes to step S46.

Figure 6:
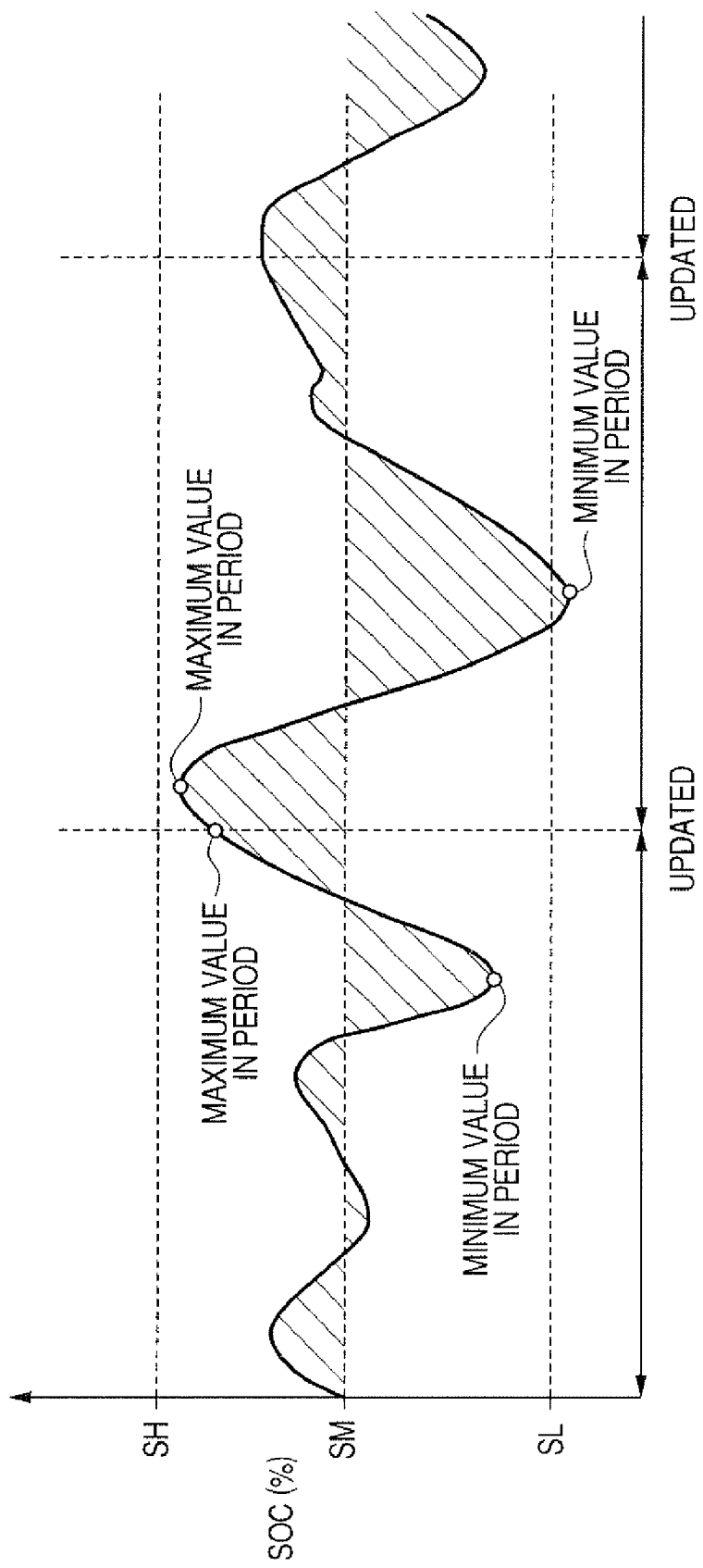
FIG. 6 shows the setting operation in detail, as shown in FIG. 4.
Figure 7:
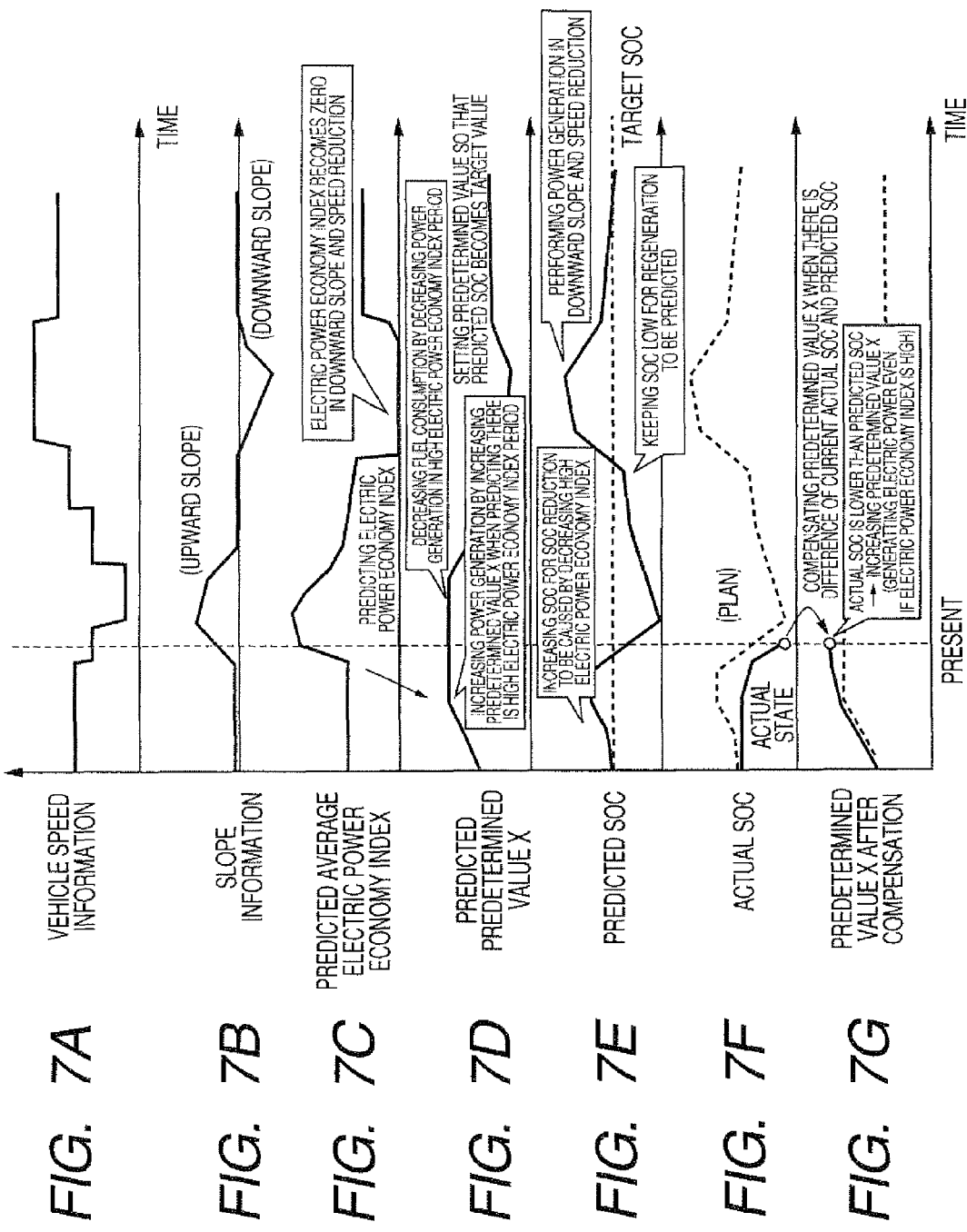
FIGS. 7A to 7G are timing charts showing the setting operation shown in FIG. 4.

At step S46, the electric power generation control apparatus 40 compensates the predetermined value X. As shown in FIG. 6, the electric power generation control apparatus 40 performs this compensation at a predetermined updating cycle. Specifically, the electric power generation control apparatus 40 compensates (or updates) the predetermined value X based on the maximum value and the minimum value of the actual SOC and the accumulated value of the difference of the actual SOC and the medium value SM during the period of time from the previous updating timing to the current updating timing.

When the maximum value of the actual SOC is almost equal to the allowable maximum value SH, the electric power generation control apparatus 40 decreases the predetermined value X. On the other hand, when the minimum value of the actual SOC is almost equal to the allowable minimum value SL, the electric power generation control apparatus 40 increases the predetermined value X. When the accumulated value of the difference of the actual SOC to the medium value SM is positive and takes a large value, the electric power generation control apparatus 40 decreases the predetermined value X. When the accumulated value of the difference of the actual SOC to the medium value SM is negative and takes a large value, the electric power generation control apparatus 40 decreases the predetermined value X.

In the flow chart shown in FIG. 4, when the process at step S46 is completed or the judgment at step S44 indicates "NO", the operation flow goes to step S40.

The series of the above processes can set the reference value over the electric power economy index for the coming driving path and can perform the optimum control of electric power generation in order to decrease the fuel consumption of the internal combustion engine 10

FIGS. 7A to 7G are timing charts showing various data items regarding the control process of electric power. In detail, FIG. 7A shows the vehicle speed information. FIG. 7B shows the slope information of the driving path. FIG. 7C shows the average value of the electric power economy index predicted based on the driving path information shown in FIG. 7A and FIG. 7B. FIG. 7D shows the predetermined value X to be set based on the driving path information shown in FIG. 7A and FIG. 7B. FIG. 7E shows the predicted SOC. FIG. 7F shows the actual SOC. FIG. 7G shows the predetermined value X after compensation.

As shown in FIG. 7A to 7G, the electric power generation control apparatus 40 predicts that the electric power economy index becomes high on the coming upward slope of the driving path, and increases the predetermined value X in order to increase the amount of electric power to be generated.

On the other hand, the electric power generation control apparatus 40 predicts that the electric power economy index becomes low on the coming downward slope of the driving path, and decreases the predetermined value X in order to decrease the amount of generated electric power.

The electric power generation control apparatus 40 can control the amount of generated electric power so that the fuel consumption is decreased under the control to set the actual SOC within the allowable SOC range.

In particular, the electric power generation control apparatus 40 according to the first embodiment sets the reference value determining function based on the driving path information. When the actual SOC and the actual operational point are different from predicted values, the electric power generation control apparatus 40 controls so that the amount of generated electric power becomes an optimum value for the actual SOC and the actual operational point. It is thereby possible to control the alternator 20 so as to decrease the increasing amount of the fuel consumption as much as possible even if the predicted operational point has an error.

According to the electric power generation control apparatus and the control system according to the first embodiment of the present invention, following effects (1) to (7) can be obtained.

(1) The reference value is set based on the driving path information. The maximum electric power is set as the amount of generated electric power of the alternator 20, where the maximum electric power is obtained when the electric power economy index calculated based on the operational state of the internal combustion engine 10 is not more than the reference value. Thus, it is possible to optimally and efficiently control the electric power generation of the alternator 20 using the reference value which is set based on the driving path information while predicting the condition of the coming driving path at this current time. It is further possible to set the optimum amount of generated electric power corresponding to the actual operational state of the internal combustion engine 10 by setting the reference value instead of setting the amount of generated electric power of the internal combustion engine 10.

(2) The electric power economy index is calculated in the case that the torque of the output shaft 12 of the internal combustion engine 10 is increased according to the amount of generated electric power of the alternator 20 under the control to maintain the current rotational speed of the internal combustion engine 10, and the amount of generated electric power of the alternator 20 is determined so that the electric power economy index is not more than the reference value. It is possible to calculate the optimum electric power economy index so that the rotational speed of the output shaft 12 of the internal combustion engine 10 is maintained even if the amount of generated electric power is changed.

(3) The reference value is set based on the actual SOC of the battery 22 and the reference value determining function which defines the relationship between the actual SOC of the battery 22 and the reference value. The predetermined value X, with which the reference value definition function is defined, is set based on the driving path information. It is thereby possible to obtain the optimum reference value which reflects the actual SOC and the condition of the coming driving path in the future.

(4) The predetermined value X is set so as to obtain the minimum amount of the fuel consumption of the internal combustion engine 10 caused by the amount of generated electric power of the alternator 20 under the condition in which the actual SOC of the battery 22 is within the allowable range based on the average-load electric power consumption of electrical devices and the predicted electric power economy index. It is thereby possible to optimally set the predetermined value X so as to obtain the minimum fuel consumption.

(5) The predetermined value X is compensated based on the actual SOC when the absolute value of the difference of the actual SOC and the predicted SOC is not less than the predetermined value β. It is thereby possible to have the optimum predetermined value X so as to decrease the fuel consumption even if there is an error in the operational point predicted based on the driving path information.

(6) In a case where the absolute value of the difference of the predicted SOC and the actual SOC is not less than the predetermined value, the predetermined value X is set again. It is thereby possible to obtain the optimum reference value even if there is an error in the predicted operational point which is predicted based on the driving path information.

(7) The electric power consumption is predicted based on the detected current value flowing out from the battery 22 while predicting the electric power of the battery 22 which will be used in the future. It is thereby possible to optimally predict the electric power consumption in the future while considering the electric power consumption of the electronic devices which the driver tends to use.

Second Embodiment

A description will be given of the navigation system as well as the electric power generation control apparatus and the control system according to the second embodiment of the present invention with reference to FIG. 8 and FIG. 9.

In the second embodiment, the navigation system 30 performs the process of setting the predetermined value X based on the driving path information instead of the electric power generation control apparatus 40. This can decrease and lightens the operational load of the electric power generation control apparatus 40, and can avoid the overload of the electric power generation control apparatus 40.

Figure 8:
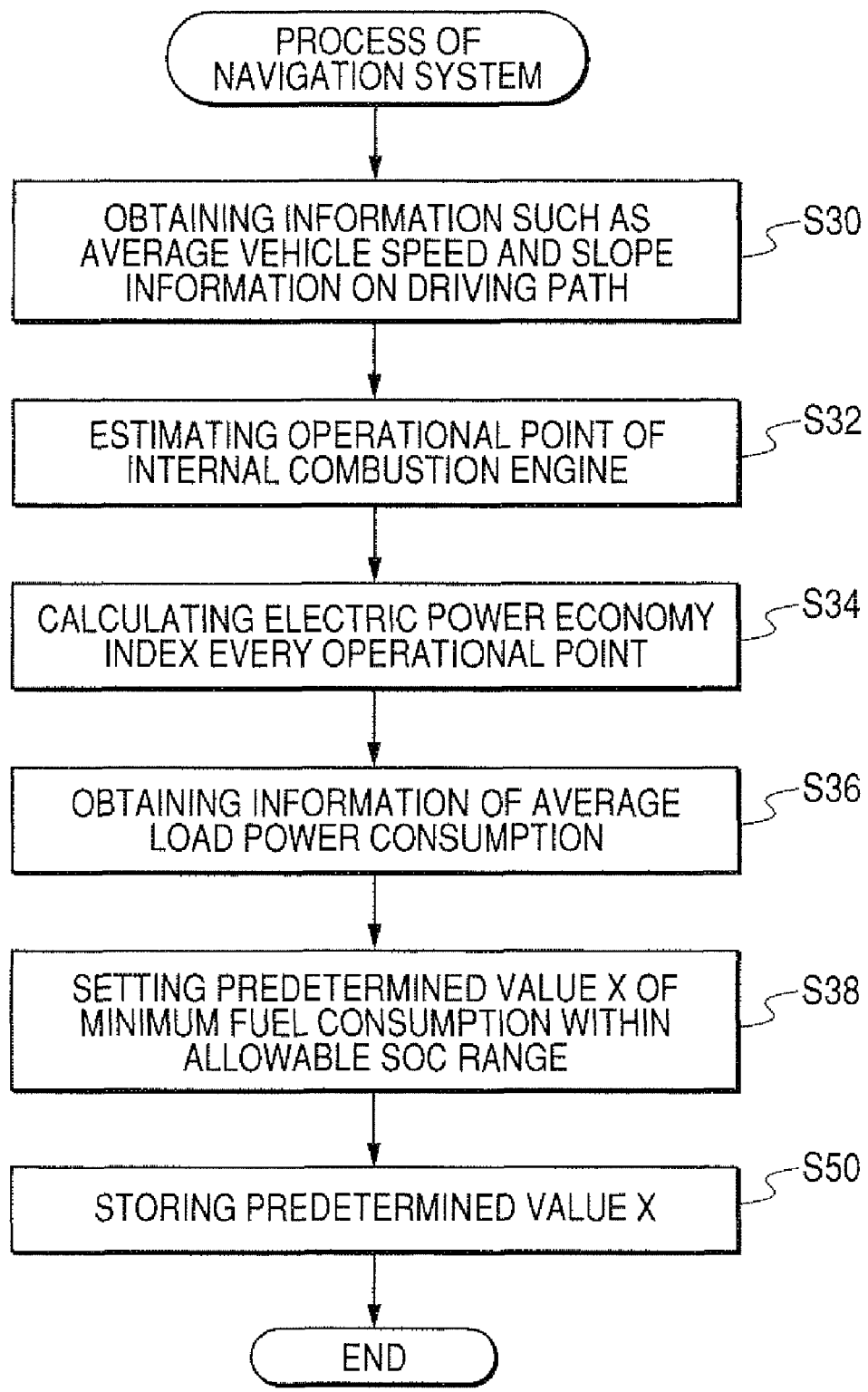
FIG. 8 is a flow chart of a process of setting the predetermined value X by the navigation system according to a second embodiment of the present invention.

FIG. 8 is a flow chart of the process of setting the predetermined value X by the navigation system according to a second embodiment. The navigation system 30 repeatedly performs this process at a predetermined cycle.

In the flow chart shown in FIG. 5, the same reference characters such as step S30 and step S32 will refer to the same steps shown in FIG. 4.

In the second embodiment, the navigation system 30 stores the predetermined value X into a memory unit (not shown) after performing step S30 to step S38.

Figure 9:
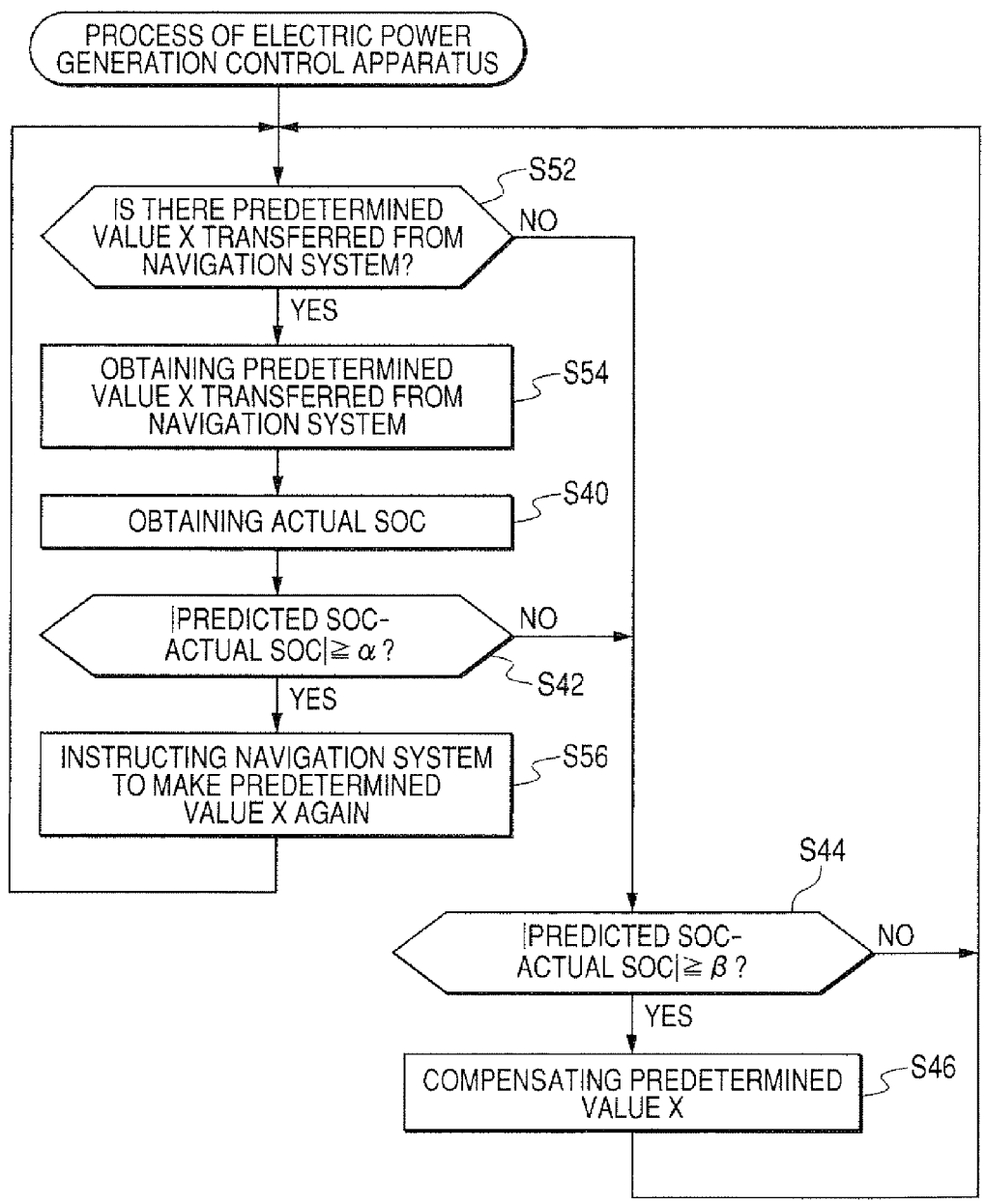
FIG. 9 is a flow chart of a process of compensating the predetermined value X by the electric power generation control apparatus accompanied with the navigation apparatus according to the second embodiment of the present invention.

FIG. 9 is a flow chart of the process of compensating the predetermined value X by the electric power generation control apparatus 40 accompanied with the navigation apparatus 30 according to the second embodiment.

The electric power generation control apparatus 40 repeatedly performs the process shown in FIG. 9 at a predetermined cycle.

In the flow chart shown in FIG. 9, the same reference characters such as step S40 and step S42 will refer to the same steps shown in FIG. 4.

At first, the electric power generation control apparatus 40 judges whether or not the navigation system 30 has already set the predetermined value X.

When the judgment result in step S52 indicates "YES", namely, the predetermined value X has already been set by the navigation system 30, the electric power generation control apparatus 40 receives the predetermined value X transferred from the navigation system 30. The electric power generation control apparatus 40 then performs the same process of steps S40 and S42, which is the same as that in the process shown in FIG. 4. When the judgment result at step S42 indicates "YES", the operation flow goes to step S56. At step S56, the electric power generation control apparatus 40 instructs the navigation system 30 to set the predetermined value X again.

When the judgment result indicates "NO" at step S52 and S42 shown in FIG. 9, the electric power generation control apparatus 40 performs the operation of step S44 and step S46, respectively, like the process shown in FIG. 4.

Still further, the judgment result at step S44 indicates "NO", or when the processes at step S46 and step S56 are completed, the operation flow returns to step S52, as shown in FIG. 9.

The second embodiment further has following effect (8) in addition to the effects (1) to (7) of the first embodiment.

(8) The navigation system 30 performs the process of compensating the predetermined value X, as shown in FIG. 8. This can efficiently avoid the excess calculation load of the electric power generation control apparatus 40.

Third Embodiment

A description will be given of the electric power generation control apparatus and the control system according to the third embodiment of the present invention with reference to FIG. 10.

FIG. 10 is a map used to aid calculation of an increased amount of fuel consumption of the internal combustion engine per electrical power amount.

The different features of the third embodiment and the first embodiment will be mainly explained. In the third embodiment, the electric power generation control apparatus 40 simply predicts the electric power economy index using the map shown in FIG. 10. In this map, the relationship between the electric power and the electric power economy index per zone divided by values which are based on the rotational speed and torque of the output shaft 12 of the internal combustion engine 10. This enables the relationship between the electric power and the electric power economy index to be easily predicted by simply predicting the operational point of the internal combustion engine 10 based on the driving path information. The third embodiment can have the same effects as the first embodiment.

Fourth Embodiment

A description will be given of the electric power generation control apparatus and the control system according to the fourth embodiment of the present invention with reference to FIG. 11. The different features of the fourth embodiment and the first embodiment will be mainly explained.

Figure 11:
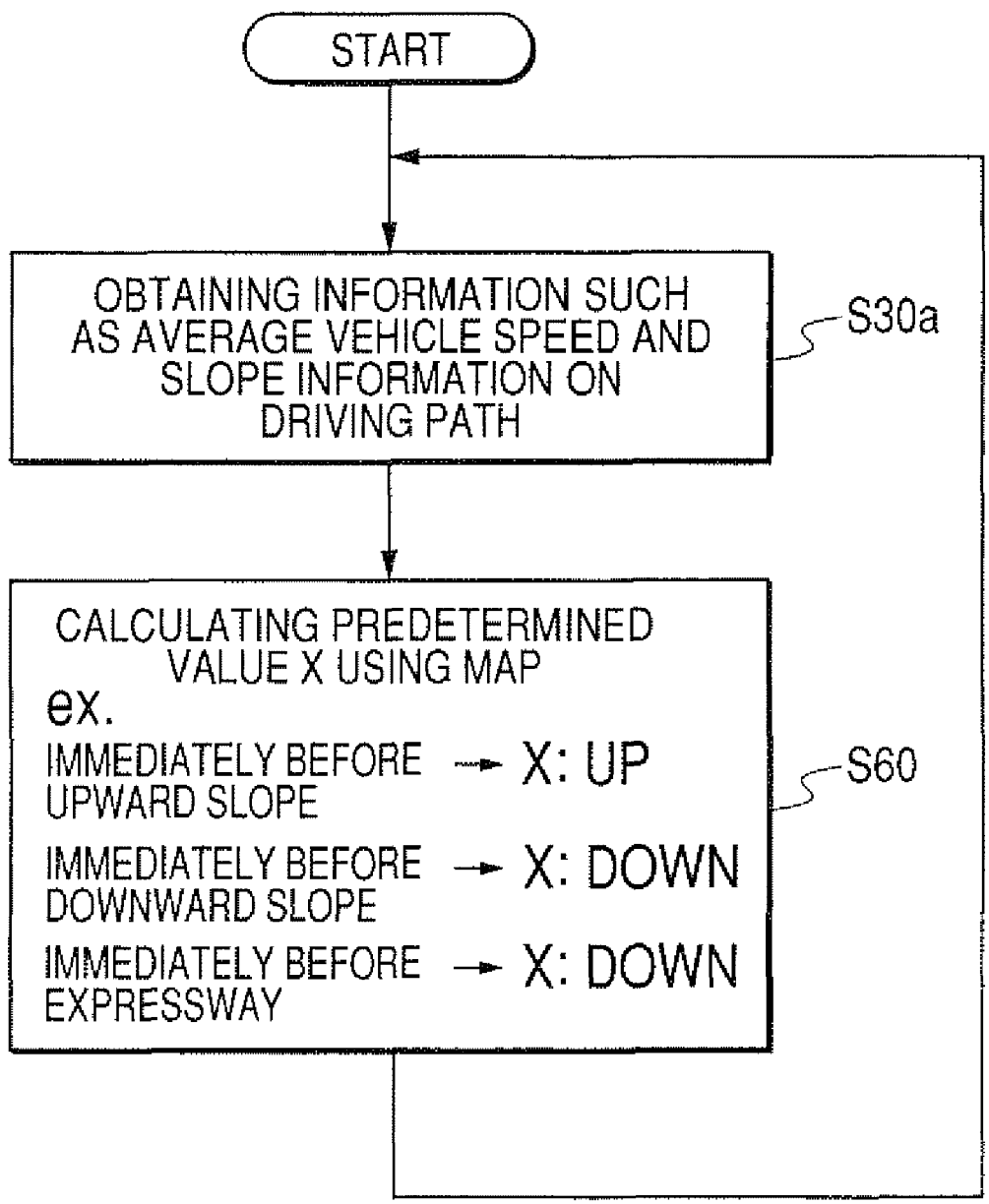
FIG. 11 is a flow chart of a process of setting the predetermined value X to be used in the electrical power generation control according to a fourth embodiment of the present invention.

FIG. 11 is a flow chart of the process of setting the predetermined value X according to the fourth embodiment of the present invention. The electric power generation control apparatus 40 repeatedly performs this process at a predetermined cycle, for example.

At step S30a in the series of the processes shown in FIG. 11, when the electric power generation control apparatus 40 obtains the driving path information for a coming driving path in the future, the electric power generation control apparatus 40 calculates the predetermined value X using the map at step S60. Information for up to several tens of kilometers preceding the vehicle makes up the driving path information.

Based on the driving path information the map may suggest increasing the amount of electric power to be generated by increasing the current predetermined value X if the driving path information predicts an increase of electric power economy index. The map may further suggest decreasing the current amount of generated electric power by decreasing the current predetermined value X when a decrease in electric power economy index is predicted based on the driving path information. Specifically, the predetermined value X is increased just before the coming upward slope of the driving path because it is predicted that the electric power economy index would be increased before long. On the other hand, the predetermined value X is decreased just before the coming downward slope of the driving path because it is predicted that the electric power economy index would be decreased before long. Still further, the predetermined value X is decreased just before the coming speedway because it is predicted to decrease the electric power economy index before long.

According to the fourth embodiment of the present invention, it is possible to obtain the effects (1) to (3) of the first embodiment prescribed above.

Fifth Embodiment

A description will be given of the electric power generation control apparatus and the control system according to the fifth embodiment of the present invention with reference to FIG. 12 and FIG. 13.

The different features of the fifth embodiment and the first embodiment will be mainly explained.

Figure 12:
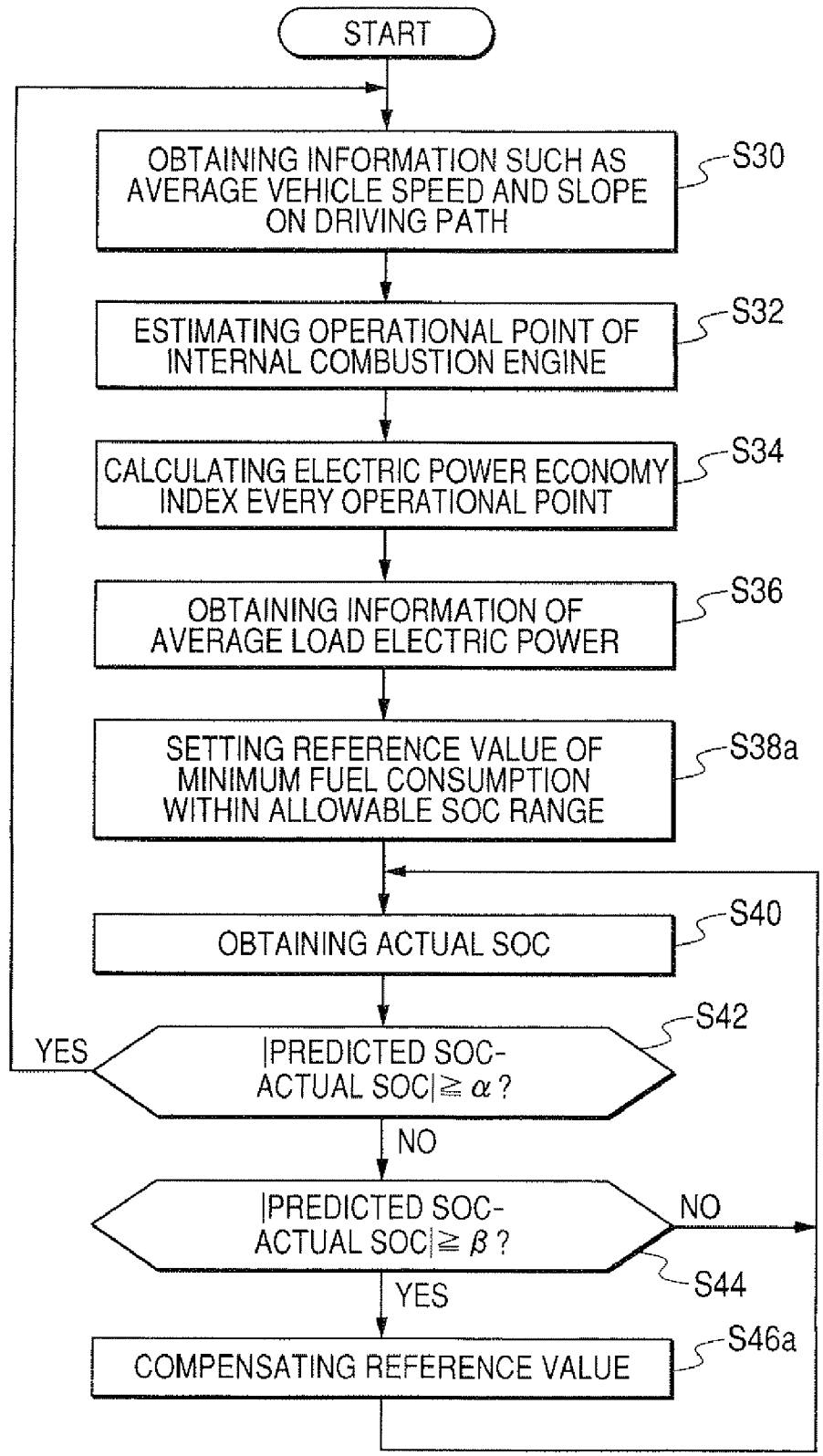
FIG. 12 is a flow chart of a process of setting a reference value to be used in the electrical power generation control according to a fifth embodiment of the present invention.

FIG. 12 is a flow chart showing the process of setting the reference value to be used in the electrical power generation control according to the fifth embodiment. The electric power generation control apparatus 40 repeatedly performs the process at a predetermined cycle.

In the flow chart shown in FIG. 12, the same reference characters such as step S30 and step S32 will refer to the same steps shown in FIG. 4.

In the series of the process shown in FIG. 12, the electric power generation control apparatus 40 calculates the reference value at the minimum fuel consumption within the allowable SOC range in step S38a. That is, in the fifth embodiment, the electric power generation control apparatus 40 directly calculates the reference value without referring the actual SOC and without using the reference value determining function. On the other hand, in step S44, when the absolute value of the difference of the predicted SOC and the actual SOC is not less than the predetermined value β, the electric power generation control apparatus 40 compensates the reference value.

In this case, the process at step S46a shown in FIG. 12 corresponds to the process at step S46 shown in FIG. 4, in which the reference value is increasingly compensated while the predetermined value X is increasingly compensated, and on the other hand, the reference value is decreasingly compensated while the predetermined value X is decreasingly compensated.

Figure 13:
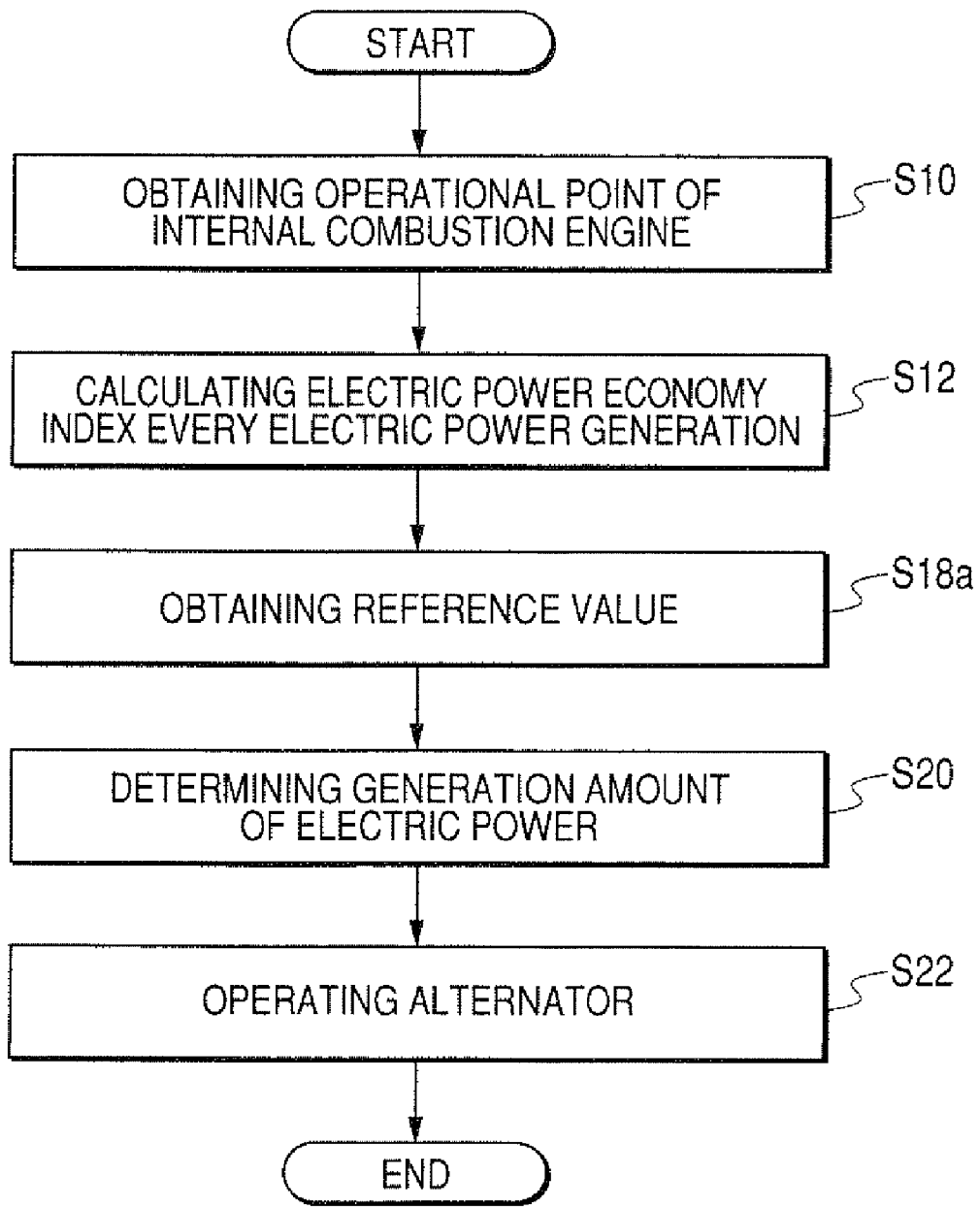
FIG. 13 is a flow chart of a process of controlling electric power generation of the alternator according to the fifth embodiment.

FIG. 13 is a flow chart of the process of controlling electric power generation of the alternator 20 according to the fifth embodiment. The electric power generation control apparatus 40 repeatedly performs this process at a predetermined cycle. In the flow chart shown in FIG. 13, the same reference characters such as step S10 and step S12 will refer to the same steps shown in FIG. 2.

As shown in FIG. 13, the electric power generation control apparatus 40 according to the fifth embodiment sets the amount of generated electric power based on the reference value which is set without using the actual SOC. The fifth embodiment has the same effects of the first embodiment prescribed above.

Sixth Embodiment

A description will be given of the electric power generation control apparatus and the control system according to the sixth embodiment of the present invention with reference to FIG. 14.

The different features of the sixth embodiment and the first embodiment will be mainly explained with reference to FIG. 14.

Figure 14:
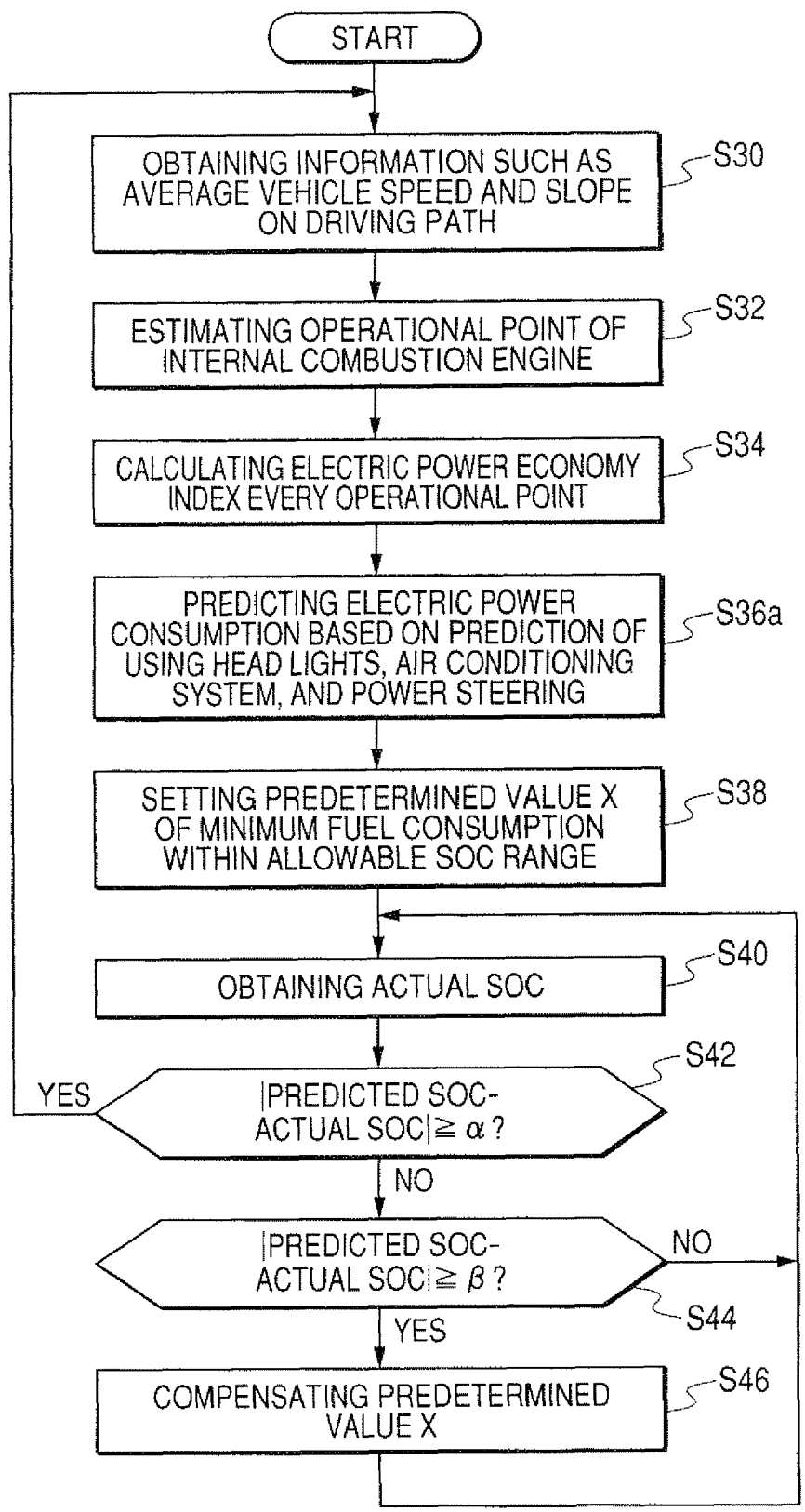
FIG. 14 is a flow chart of a process of setting the predetermined value X to be used in the electrical power generation control according to a sixth embodiment of the present invention.

FIG. 14 is a flow chart of the process of setting the predetermined value X to be used in the electrical power generation control according to a sixth embodiment of the present invention.

The electric power generation control apparatus 40 repeatedly performs the process shown in FIG. 14 at a predetermined cycle.

In the flow chart shown in FIG. 14, the same reference characters such as step S30 and step S32 will refer to the same steps shown in FIG. 4.

In step S36a, the electric power generation control apparatus 40 predicts the total electric power consumption based on the predicted electric power consumption for the head lights 24, the power steering 26, and the air conditioning system 28. Those electronic devices generally consume a lot of electric power. This prediction can be carried out based on the driving path information and driving time. For example, when the electric power generation control apparatus 40 predicts that the vehicle would pass through a tunnel based on the driving path information, the head lights 24 would be used in the tunnel. Still further, when in the evening, the driver uses the head lights 24 as soon as the sun sets. When it is predicted that there are many curves on the coming driving path based on the driving path information, the electric power generation control apparatus 40 predicts that the power steering 26 would be used on the curves.

When it is predicted that the vehicle drives in a hot area (whose temperature is more than a predetermined value) or in a cold area (whose temperature is less than a predetermined value), it can be predicted that the air conditioning system 28 would be used there.

The electric power generation control apparatus 40 according to the sixth embodiment has the following effect (9) in addition to the effects (1) to (7) prescribed above.

(9) The electric power generation control apparatus 40 predicts the use of the power steering 26, the air conditioning system 28, the head lights 24 based on the coming driving path information and the current time, and predicts the entire amount of electric power consumption of the vehicle. It is thereby possible to accurately predict the electric power consumption amount.

Seventh Embodiment

A description will be given of the electric power generation control apparatus and the control system according to the seventh embodiment of the present invention with reference to FIG. 15.

The different features of the seventh embodiment and the first embodiment will be mainly explained with reference to FIG. 15.

Figure 15:
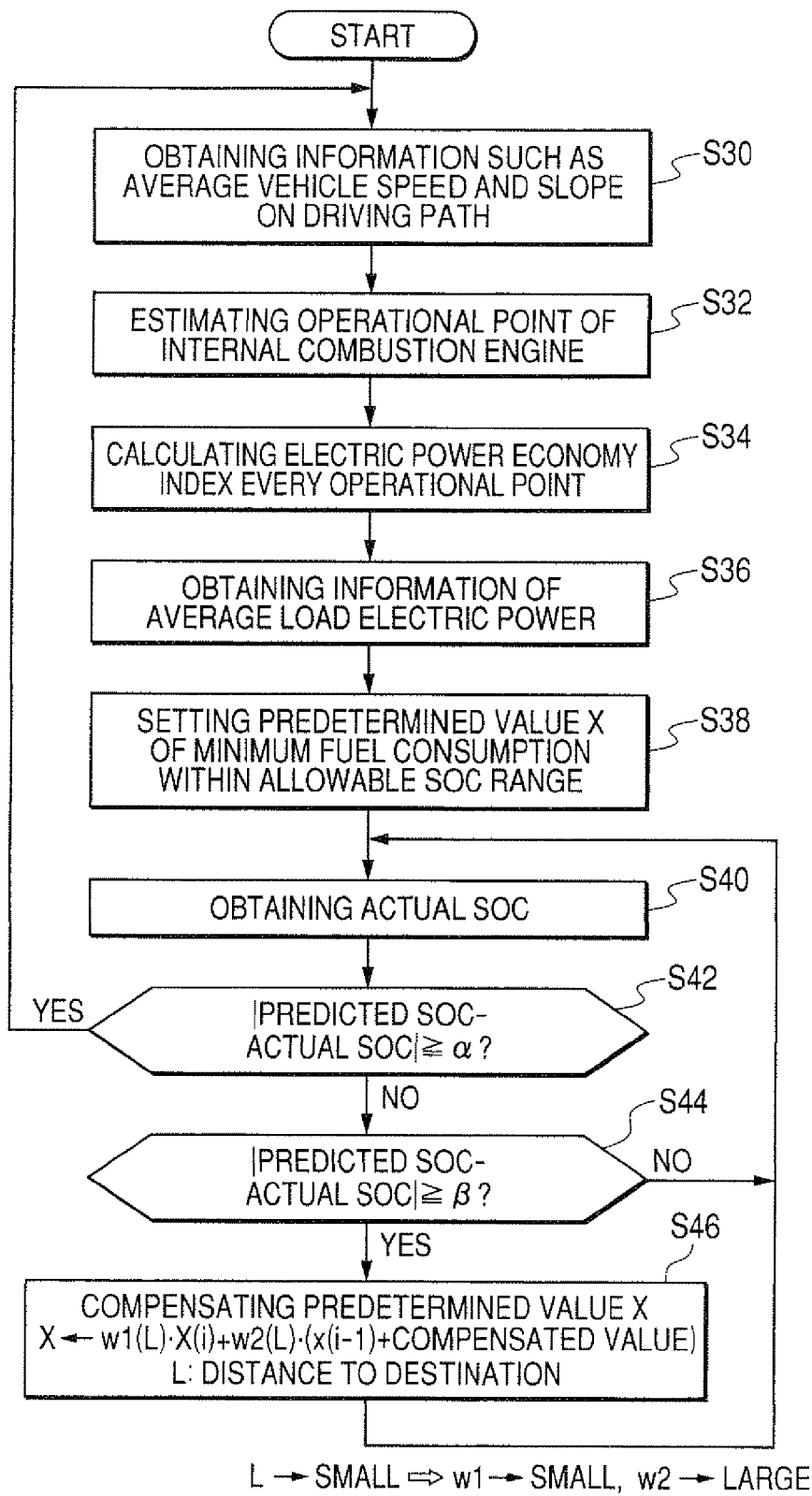
FIG. 15 is a flow chart of a process of setting the predetermined value X to be used in the electrical power generation control according to a seventh embodiment of the present invention.

FIG. 15 is the flow chart of the process of setting the predetermined value X to be used in the electrical power generation control according to the seventh embodiment. The electric power generation control apparatus 40 repeatedly performs the process shown in FIG. 15 at a predetermined cycle.

In the flow chart shown in FIG. 15, the same reference characters such as step S30 and step S32 will refer to the same steps shown in FIG. 4.

In the seventh embodiment shown in FIG. 15, it is judged that the absolute value of the difference of the predicted SOC and the actual SOC is not less than the predetermined value $\beta$ at step S44, the electric power generation control apparatus 40 calculates a weighted average of an updated value X(i) and a previous predetermined value X(i−1) when the predetermined value X is compensated based on the actual SOC, where the updated value X(i) of the predetermined value at the current time is determined based on the driving path information, and the previous predetermined value X(i−1) has already been compensated.

In this compensation operation, the electric power generation control apparatus 40 further considers the compensated value of the previous predetermined value X(i−1) when the vehicle more draws closer to its destination. This compensation operation can be realized to use coefficients w1 and w2 as the function in distance until arriving of the destination, where the updated value X(i) is multiplied by the coefficient w1, and the compensated value of the previous predetermined value X(i−1) is multiplied by the weight w2.

Because the electric power generation control apparatus 40 further considers the compensated value based on the actual SOC when the vehicle gets closer to the destination, it is possible to control the actual SOC at the destination to be a value near a desired value (for example, the medium value SM).

The electric power generation control apparatus 40 according to the seventh embodiment has the following effect (10) in addition to the effects (1) to (7) prescribed above.

(10) The electric power generation control apparatus 40 further considers the compensated value based on the actual SOC rather than the updated value of the predetermined value X based on the driving path information when the vehicle draws closer and closer to the destination, it is possible to control the actual SOC at the destination to be a value near a desired value (for example, the medium value SM). It is thereby possible to control the actual SOC at the destination to be a value near a desired value (for example, the medium value SM).

Eighth Embodiment

A description will be given of the navigation system 30 according to the eighth embodiment of the present invention with reference to FIG. 16.

The different features of the eighth embodiment and the sixth embodiment will be mainly explained with reference to FIG. 16.

Figure 16:
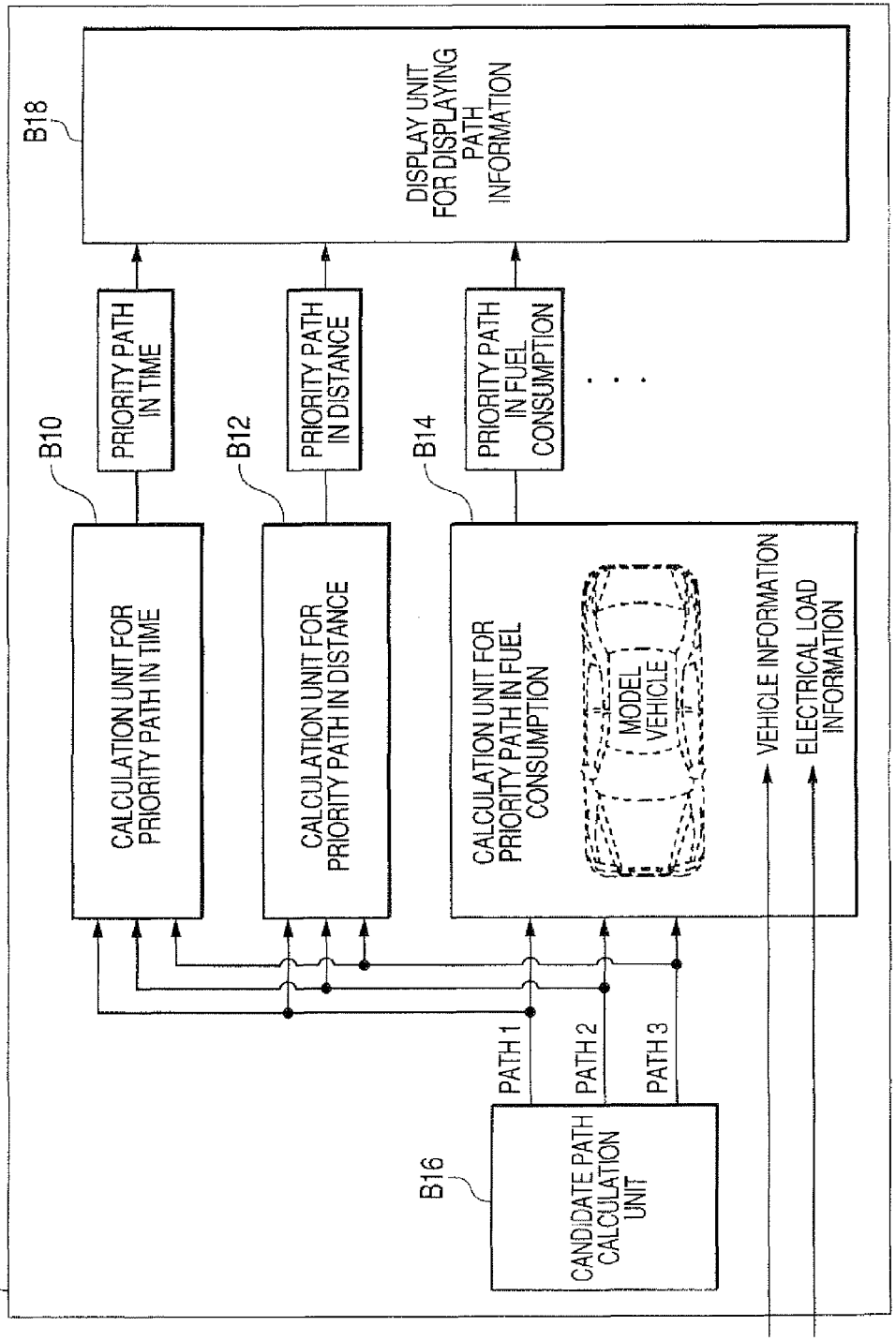
FIG. 16 is a block diagram showing a navigation system according to an eighth embodiment of the present invention.

FIG. 16 is a block diagram showing the functions of the navigation system 30 according to the eighth embodiment. As shown in FIG. 16, the navigation system 30 is comprised of various calculation units for determining the path which satisfies various requests. For example, the calculation unit B10 searches the path which satisfies the request of having the shortest driving-time, the calculation unit B12 searches the path which satisfies the request to have the shortest distance, and the calculation unit B14 searches the path which satisfies the request to have the minimum fuel consumption.

Each of those units selects one of the paths, calculated by the candidate path calculation unit B16, which satisfies the specified request.

The path display unit B18 receives the output data transferred from each unit B10, B12, and B14, and informs the received one to the user, for example, through a display unit and a speaker unit.

Figure 17:
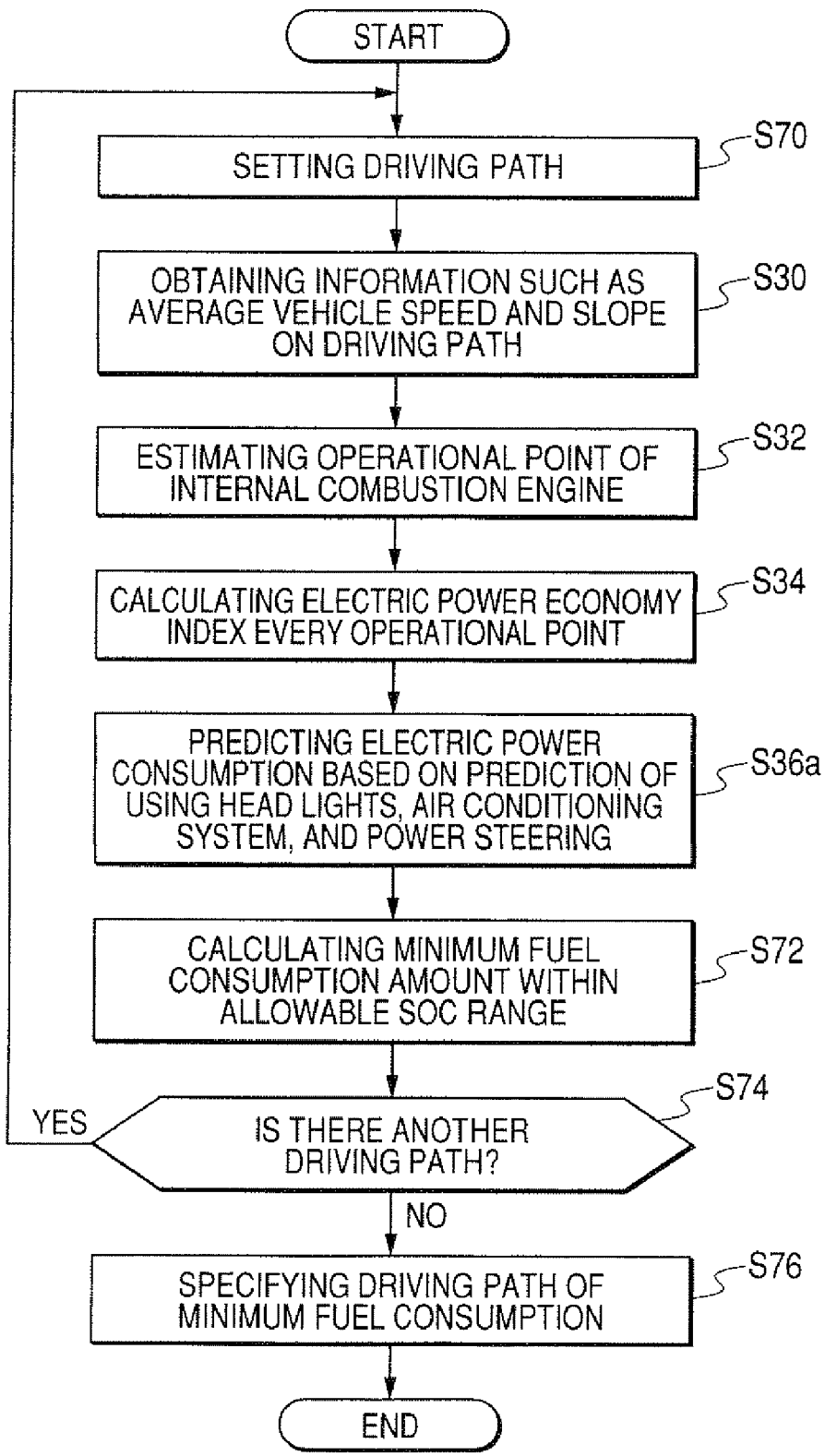
FIG. 17 is a flow chart of a process of calculating a driving path having the minimum fuel consumption by the navigation system according to the eighth embodiment of the present invention.

FIG. 17 is a flow chart showing the process performed by the calculation unit B14 in the navigation system 30. The calculation unit B14 searches the path satisfying the request of having the minimum fuel consumption. The electric power generation control apparatus 40 repeatedly performs this process of the calculation unit B14 at a predetermined cycle.

In the flow chart shown in FIG. 17, the same reference characters such as step S30 and step S32 will refer to the same steps shown in FIG. 4 and FIG. 14.

In the series of processes shown in FIG. 17, the electric power generation control apparatus 40 sets the driving path on which the vehicle drives. In step S70, the electric power generation control apparatus 40 selects one of the candidate paths calculated by the candidate path calculation unit B16.

Like the processes shown in FIG. 14, the electric power generation control apparatus 40 performs the processes of step S30 to step S36a, after selecting the one of the candidate paths.

At step S72, the electric power generation control apparatus 40 calculates the minimum amount of fuel consumption under the condition in which the SOC is within the allowable range. This amount of fuel consumption is not the increased amount by the electric power generation of the alternator 20, but the amount of fuel consumption of the internal combustion engine 10 until the vehicle arrives the destination.

This process calculates the minimum value of the summation of the fuel consumption which is increased by the electric power generation of the alternator 20 calculated by the process according to the sixth embodiment and the fuel consumption (not including the fuel consumption increased by the electric power generation) of the internal combustion engine 10 calculated based on each predicted operational point.

According to the eighth embodiment, the electric power generation control apparatus 40 calculates the summation of the predicted value of the fuel consumption of the internal combustion engine 10 without including the amount increased by the electric power generation and the amount of the fuel consumption increased by the electric power generation of the alternator 20. The electric power generation control apparatus 40 thereby calculates the amount of fuel consumption of the vehicle when the electric power generation control is performed using the predetermined value X calculated by the process shown in FIG. 14 when the motor vehicle actually drives.

In the following step S74, the electric power generation control apparatus 40 judges whether or not there is another path on which the vehicle can drive. When the judgment result indicates at step S74 indicates the presence of another path, the operation flow returns to step S70.

On the other hand, when there is not another path, namely, all the paths calculated by the candidate path calculation unit B16 have been already checked, the operation flow goes to step S76.

At step S76, the electric power generation control apparatus 40 specifies and selects the driving path of the minimum amount of fuel consumption. After completion of the process of step S76, the series of processes shown in FIG. 17 is completed.

According to the eighth embodiment of the present invention, it is possible to further obtain the effect (11) in addition to the effects (1) to (10) prescribed above.

(11) The electric power generation control apparatus 40 has the calculation unit B14 which searches the driving path of the minimum fuel consumption to the destination under the electric power generation is controlled based on the driving path information in order to have the minimum amount of the fuel consumption which is increased by the electric power generation. It is thereby possible to indicate the path to the destination with minimum fuel consumption to the user.

Other Modifications

It is possible to modify the embodiments prescribed above as follows.

In the fourth embodiment, it is possible to perform the processes shown in FIG. 11 when the driver does not input any destination into the navigation system 30. That is, the predetermined value X can be calculated based on the driving path information under the condition in which the current path does not have a branch within forward several hundred meters on which the vehicle drives.

In the fourth embodiment, it is possible to calculate the reference value using the map instead of calculating the predetermined value X using the map.

In the fourth embodiment, it is possible to compensate the predetermined value X, which is calculated using the map, based on the actual SOC. Although it is compensated based on the difference of the actual SOC from the medium value SM, it is preferable to compensate the predetermined value X based on the difference of the actual SOC and the medium value compensated based on the driving path information. For example, because it is desirable to decreasingly control the electric power just before an upward slope of the driving path in order to decrease the entire fuel consumption of the vehicle, it is preferred to calculate the compensated value based on the difference of the compensated medium value and the actual SOC. In this case, similar to the process of the seventh embodiment, it is possible to use the feedback compensation of the reference value rather than using the fixed reference value when the motor vehicle gets closer to the destination.

In the fifth embodiment, it is possible for the navigation system 30 to calculate the reference value, like the process of the second embodiment.

In the fifth embodiment, it is possible to calculate the electric power economy index using the map which is used in the process of the third embodiment.

Although the process of the first embodiment is changed with the processes of the sixth embodiment, this same change can be applied to the processes of the fifth embodiment.

Further, although the process of the first embodiment is changed with the processes of the seventh embodiment, this same change can be applied to the processes of each of the second, third, fourth, and sixth embodiments.

Still further, it is possible to calculate the electric power economy index using the map which is used in the processes of the third embodiment.

In the embodiments prescribed above, the predetermined value X is compensated based on the maximum, minimum, and changed values of the actual SOC within a past predetermined period of time. The present invention is not limited by this. For example, it is possible to perform a feedback control to apply the actual SOC into the predicted SOC based on the magnitude of the difference between the predicted SOC and the actual SOC.

In the embodiments, the alternator 20 is so controlled that the amount of generated electric power of the alternator 20 has the maximum value when the electric power economy index accompanied with the amount of generated electric power of the alternator 20 becomes equal to the reference value. The present invention is not limited by this. For example, it is possible to control the alternator 20 so that the alternator 20 has the amount of generated electric power when the electric power economy index accompanied with the amount of generated electric power of the alternator 20 is not more than the reference value and becomes the minimum value.

Still further, it is possible to control the alternator 20 so that the amount of generated electric power of the alternator 20 is decreased when the current amount of the generated electric power is not less than the reference value by a predetermined value, and on the other hand, the amount of generated electric power is increased when the current amount of generated electric power is less than the reference value by a predetermined value or more.

It is possible to use another function instead of the reference value determining function prescribed above. For example, the electric power generation control apparatus 40 can use a map which indicates the relationship between the SOC of the battery 22 and the reference value. In this cases it is preferable that this relationship satisfies that the less the SOC of the battery 22, the more the reference value has. Even if the electric power economy index becomes relatively large, using the map of this relationship can perform the generation operation of electric power of the alternator 20 when the battery 22 has a low SOC and there is a desire to increase the SOC of the battery 22. It is preferable to have this relationship so that the reference value is not less than the electric power economy index with which the amount of generated electric power of the alternator 20 becomes the maximum amount at the allowable lowest value of the SOC, and the reference value is the value with which the alternator 20 does not generate any electric power at the allowable upper limit of the SOC.

Features and Effects

In the electric power generation control apparatus according to another aspect of the present invention, the electric power economy index calculation means calculates the electric power economy index for various electric power generation amounts based on the change of the currently operational state of the internal combustion engine which is caused by setting various electric power generation amounts of the electric power generation means.

Because the electric power generation means provides the torque of various values to the output shaft of the internal combustion engine based on the amount of generated electric power, it is possible to change the currently operational state of the internal combustion engine by changing the amount of generated electric power of the electric power generation means. Accordingly, because the electric power economy index calculation means calculates the electric power economy index for various electric power generation amounts based on changes of the operational state of the internal combustion engine, it is possible to obtain the electric power economy index corresponding to various electric power generation amounts of the electric power generation means with high accuracy.

The electric power generation control apparatus as another aspect of the present invention further has a means for storing relational information which determines the relationship between the fuel consumption ratio and the rotational speed and torque of the internal combustion engine. In the electric power generation control apparatus, the electric power economy index calculation means calculates the electric power economy index when the torque is increased according to the amount of generated electric power of the electric power generation means under the control to maintain the rotational speed of the output shaft of the internal combustion engine.

It is desirable to maintain the rotational speed of the internal combustion engine even if the amount of generated the electric power of the electric power generation means is changed because the driver of the motor vehicle falls into disorder in driving when the rotational speed of the internal combustion engine is changed. On the other hand, it is possible to determine the fuel consumption ratio based on the rotational speed and the torque which indicate the typical operational state or condition of the internal combustion engine. Therefore it is possible to calculate the optimum electric power economy index under the control for keeping the rotational speed of the internal combustion engine constant even if the amount of generated electric power of the electric power generation means is changed.

In the electric power generation control apparatus according to another aspect of the present invention, the electric charging means is mounted to the motor vehicle. The electric charging means charges electric power generated by and supplied from the electric power generation means.

The setting means has a defining means for defining a relationship between the SOC of the electric charging means and the reference value based on the driving path information. In particular, the setting means sets the reference value based on the relationship between the relationship defined by the defining means and the current SOC of the electric charging means.

It is thereby possible to set the optimum reference value based on the current SOC of the electric charging means by setting the reference value based on the current SOC of the electric charging means and the relationship defined by the defining means. The defining means can set the optimum reference value while considering a coming driving path in the future because the above relationship is defined based on the driving path information.

Moreover, it is desirable that the less the SOC of the electric charging means is, the more the reference value is increased. This enables the electric power generation means to generate electric power even if the electric power economy index has a relatively large value when there is a demand to increase the SOC of the electric charging means when the SOC is low. In the relationship, it is desirable that the reference value is not less than the maximum value of the electric power economy index when the amount of generated electric power of the electric power generation means has the maximum value at the allowable lower limit value of the SOC, and the reference value is set to a value where the electric power generation means does not generate electric power at the allowable upper limit value of the SOC.

In the electric power generation control apparatus according to another aspect of the present invention, the setting means further has an electric power consumption amount prediction means, an operational state prediction means, and an electric power economy index prediction means. The electric power consumption amount prediction means predicts the amount of electric power in the future. The operational state prediction means predicts operational state of the internal combustion engine in the future. The electric power economy index prediction means predicts the electric power economy index for various electric power generation amounts based on the change of the operational state which is set by the amount of generated electric power of the electric power generation means in the predicted operational state of the internal combustion engine. In the electric power generation control apparatus, the defining means defines the above relationship so that the fuel consumption amount of the internal combustion engine caused by the electric power generation of the electric power generation means becomes a minimum value within the allowable range of the SOC of the electric charging means based on the predicted electric power consumption and the calculated electric power economy index.

According to the present invention, it is possible to set the optimum relationship in order to have the minimum amount of fuel consumption under the allowable charging-amount range of the electric charging means by calculating the electric power economy index of various electric power generation amounts based on the predicted operational state of the internal combustion engine in the future as well as predicting the future amount of fuel consumption.

Further, it is desirable to use the operational state of the internal combustion engine which is determined by the rotational speed and the torque. It is also desirable for the electric power economy index prediction means to use the electric power economy index when the torque is increased according to the amount of generated electric power which is set under the control to maintain the rotational speed.

The electric power generation control apparatus according to another aspect of the present invention further has a means for setting a target SOC of the electric charging means caused by the electric power generation control using the relationship defined by the defining means when the operational state prediction means performs the correct prediction and the electric power consumption amount prediction means performs the correct prediction. The defining means compensates the relationship based on the actual SOC of the electric charging means when the actual SOC becomes different from the target SOC when the electric power generation processing means controls the electric power generation in order to control the electric power economy index based on the reference value.

When there is an error, namely, a difference of the prediction of the operational state prediction means and the electric power consumption amount prediction means, the actual SOC becomes different from the predicted SOC by performing the electric power generation control using the relationship defined by the defining means. In a case of having a large different value of the actual SOC from the predicted one, it is possible to separate the relationship set based on the driving path information from the optimum one. According to the present invention, because the relationship is compensated based on the actual SOC of the electric charging means, it is possible to obtain the optimum relationship set by the setting means in the view of decreasing the amount of fuel consumption even if the prediction has an error.

In the electric power generation control apparatus according to another aspect of the present invention, the obtaining means obtains the driving path information when a destination is input into the navigation system mounted to the motor vehicle. The setting means more considers the compensated relationship based on the actual SOC of the electric charging means rather than the updated relationship based on the driving path information when the motor vehicle further approaches the destination.

There is a tendency to consider the target SOC when the motor vehicle arrives at the destination as the SOC of the electric charging means to be necessary at the destination. It is thereby desirable that the actual SOC is equal to the target SOC. According to the present invention, the more the motor vehicle approaches the destination, the more the compensation becomes the important factor. It is thereby possible for the actual SOC of the electric charging means to optimally approach or equal to the target SOC when the motor vehicle arrives at the destination.

In the electric power generation control apparatus according to another aspect of the present invention, the setting means sets the relationship again when the difference of the target SOC and the actual SOC is not less than a predetermined value.

When the SOC of the electric charging means becomes largely different form the target SOC, it is possible for the relationship defined based on the driving path information to be largely different from the optimum value in order to decrease the amount of fuel consumption. According to the present invention, from considering this point, it is possible to have the optimum reference value by setting the relationship again when the difference of the target SOC and the actual SOC is not less than a predetermined value.

In the electric power generation control apparatus according to another aspect of the present invention, the setting means has an electric power consumption amount prediction means, an operational state prediction means, and an electric power economy index prediction means. The electric power consumption amount prediction means predicts the amount of electric power consumption in the future. The operational state prediction means predicts the operational state of the internal combustion engine in the future. The electric power economy index prediction means predicts the electric power economy index for various electric power generation amounts based on the change of the operational state of the internal combustion engine to be caused by various electric power generation amounts by the electric power generation means under the predicted operational state of the internal combustion engine. In particular, the setting means sets the reference value so that the amount of fuel consumption of the internal combustion engine caused by the electric power generation of the electric power generation means based on the predicted amount of electric power consumption and the calculated electric power economy index within the allowable range of the SOC of the electric charging means.

According to the present invention, it is possible to optimally set the reference value so that the amount of fuel consumption becomes the minimum amount within the allowable range of the SOC of the electric charging means by predicting the future electric power consumption and calculating the electric power economy index for various electric power generation amounts based on the prediction result of the future operational state of the internal combustion engine.

It is desirable that the operational state of the internal combustion engine is determined based on the rotational speed and the torque. In this case, it is desirable for the electric power economy index prediction means to calculate the electric power economy index when the torque is increased according to the amount of generated electric power which is sequentially set under the control to maintain the rotational speed.

In the electric power generation control apparatus according to another aspect of the present invention, the electric power consumption amount prediction means predicts the electric power consumption and also predicts the use of at least one of a power steering, an air conditioning system, and head lights based on at least one of the driving path information and time information.

In general, electrical devices such as the power steering, the air conditioning system, and the head lights require large-amount electric power consumption. It is possible to largely decrease the SOC of the electric charging means on using those electrical devices. According to the present invention, it is possible to predict the electric power consumption with high accuracy because the amount of electric power consumption is predicted while predicting the presence of using at least one of those electrical devices.

In the electric power generation control apparatus according to another aspect of the present invention, the electric power consumption amount prediction means predicts the amount of electric power consumption and also predicts a supplying amount of electric power from the electric charging means in the future based on a detected current value flowing out from the electric charging means.

The current amount flowing out from the electric charging means is an important parameter which indicates the tendency to consume the electric power consumption by the driver of the motor vehicle. From this view point, it is possible to optimally predict the amount of electric power consumption based on the detected value of a current flowing out from the electric charging means.

In the electric power generation control apparatus according to another aspect of the present invention, the obtaining means obtains the driving path information from the on-vehicle navigation system mounted to the motor vehicle. The navigation system is equipped with the electric power consumption amount prediction means, the operational state prediction means, and the electric power economy index prediction means.

In general, because the calculation work of the electric power consumption amount prediction means, the operational state prediction means, and the electric power economy index prediction means becomes large, the hardware source other than the on-vehicle navigation system becomes overloaded if performing all of those calculations. On the other hand, there is a possibility that the hardware source in the on-vehicle navigation system has a capacity enough to adequately perform those calculations, and there is no limitation to extend the size of the hardware source in the navigation system. According to the present invention, from this view point, the electric power consumption amount prediction means, the operational state prediction means, and the electric power economy index prediction means are realized in the hardware source of the navigation system. This can avoid the overload of the hardware source of the electric power generation control apparatus.

In accordance with another aspect of the present invention, there is provided an electric power generation control system having the electric power generation control apparatus and the electric power generation means prescribed above.

In the navigation system according to another aspect of the present invention, the electric charging means is mounted to the motor vehicle. The electric charging means charges electric power generated by the electric power generation means. In particular, the total fuel consumption amount prediction means has an electric power consumption amount prediction means, an operational state prediction means, an electric power economy index prediction means, and a means for predicting a minimum amount of fuel consumption of the internal combustion engine.

The electric power consumption amount prediction means predicts the amount of electric power consumption in the future to be supplied from the electric charging means until the motor vehicle arrives at the destination. The operational state prediction means predicts the operational state of the internal combustion engine in the future based on the driving path to be set. The electric power economy index prediction means predicts the electric power economy index for various electric power generation amounts based on the change of the operational state of the internal combustion engine when the electric power generation means generates the electric power of a specified amount under the predicted operational state of the internal combustion engine. The minimum amount of fuel consumption of the internal combustion engine predicted by the above means includes an increased amount of the electric power generation generated by the electric power generation means based on the predicted amount of electric power consumption and the calculated electric power economy index within the allowable range of the SOC of the electric charging means for various driving paths to be set.

According to the present invention, it is possible to optimally predict the minimum amount of the fuel consumption including the increased amount of the fuel consumption amount, which is caused by the electric power generation, within the allowable range of the SOC of the electric charging means by predicting the amount of future electric power consumption and by calculating the electric power economy index for various electric power generation amounts based on the prediction result of the future operational state of the internal combustion engine.

It is desirable to have the operational state which is determined by the rotational speed and the torque. In this case, it is desirable for the electric power economy index prediction means to calculate the electric power economy index when the torque is increased according to the amount of generated electric power to be set under the control to maintain the rotational speed.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An electric power generation control apparatus for controlling an amount of electric power to be generated by an electric power generator configured to generate electric power by a rotary force supplied from an output shaft of an internal combustion engine mounted on a motor vehicle, and an electric charger, being mounted on the motor vehicle, capable of charging the electric power generated by the electric power generator, the electric power generation control apparatus comprising:
an electric power economy index calculation unit configured to calculate an electric power economy index, which is defined as an increased amount of a fuel consumption of the internal combustion engine per amount of electric power generated by the electric power generator, on the basis of a current operational state of the internal combustion engine;
an electric power generation processor configured to adjust an actual electric power economy index of the electric power generator on the basis of a reference value;
an obtaining unit configured to obtain driving path information about a forward driving path ahead of the motor vehicle; and
a setting unit comprising a defining unit configured to define a relationship between the amount of electric power charged in the electric charger and the reference value on the basis of the driving path information, and the setting unit being configured to set the reference value based on the relationship between the relationship obtained by the defining unit, the driving path information, and a current state of charge (current SOC) as a current amount of electric power charged in the electric charger.

2. The electric power generation control apparatus according to claim 1, wherein the electric power economy index calculation unit is configured to calculate the electric power economy index, which corresponds to every setting amount of electric power to be generated by the electric power generator, while considering a change of the operational state from the current operational state of the internal combustion engine.

3. The electric power generation control apparatus according to claim 2, further comprising a storage unit configured to store relational information which determines the relationship between a rotational speed, a torque and a fuel consumption ratio of the internal combustion engine,
wherein the electric power economy index calculation unit is configured to calculate the electric power economy index when the torque is increased according to the amount of electric power generated by the electric power generator while maintaining the current rotational speed of the internal combustion engine.

4. The electric power generation control apparatus according to claim 1, wherein the setting unit further comprises:
an electric power consumption amount prediction unit configured to predict the amount of electric power to be consumed in a future;
an operational state prediction unit configured to predict the operational state of the internal combustion engine in a future on the basis of the driving path information; and
an electric power economy index prediction unit configured to predict the electric power economy index per every amount of generated electric power on the basis of the change of the operational state of the internal combustion engine by every setting amount of electric power to be generated by the electric power generator under the predicted operation state of the internal combustion engine,
wherein the defining unit is configured to define the relationship between the SOC of the electric charger and the reference value so that the amount of fuel consumption of the internal combustion engine accompanied with the electric power generation by the electric power generator becomes a minimum value within an allowable range of the SOC of the electric charger based on the predicted electric power consumption and the calculated electric power economy index.

5. The electric power generation control apparatus according to claim 4, further comprising a setting unit configured to set a target SOC of the electric charger when the control of electric power generation is executed by using the relationship defined by the defining unit when the prediction result of the operational state prediction unit and the prediction result of the electric power consumption amount prediction unit are correct, and wherein the defining unit is configured to adjust the relationship on the basis of the actual SOC when the actual SOC of the electric charger becomes different from the target SOC of the electric charger when the electric power generation processor controls the electric power generation of the electric power generator in order to adjust the electric power economy index on the basis of the reference value.

6. The electric power generation control apparatus according to claim 5, wherein the obtaining unit is configured to obtain the driving path information on the basis of a destination data which is input into a navigation system mounted on the motor vehicle, and the defining unit is configured to more consider the adjusted relationship obtained on the basis of the actual SOC of the electric charger rather than an updated relationship obtained on the basis of the driving path information when the motor vehicle more approaches the destination.

7. The electric power generation control apparatus according to claim 5, wherein the setting unit is configured to set the relationship again when a difference between the target SOC and the actual SOC is not less than a predetermined value.

8. The electric power generation control apparatus according to claim 4, wherein the electric power consumption amount prediction unit is configured to predict the amount of electric power consumption while predicting the use of at least one of a power steering, an air conditioning system, and head lamps on the basis of at least one of the driving path information and time information.

9. The electric power generation control apparatus according to claim 4, wherein the electric power consumption amount prediction unit is configured to predict the amount of electric power consumption while predicting a discharging amount of electric power of the electric charger to be supplied in a future on the basis of a detected current value flowing from the electric charger.

10. The electric power generation control apparatus according to claim 4, wherein the obtaining unit is configured to obtain the driving path information from the navigation system mounted on the motor vehicle, and the navigation system is equipped with the electric power consumption amount prediction unit, the operational state prediction unit and the electric power economy index prediction unit.

11. An electric power generation control system, comprising:

the electric power generation control apparatus according to claim 1; and a navigation system, wherein
the navigation system comprises:
a driving path setting unit configured to set every driving path of the motor vehicle on the basis of information of a destination which is input;
a total fuel consumption amount prediction unit configured to predict an amount of fuel consumption of the internal combustion engine while considering an additional amount of electric power increased by the electric power generator every driving path set by the setting unit; and
an output configured to output the driving path having a minimum amount of fuel consumption predicted.

12. An electric power generation control system, comprising:

the electric power generation control apparatus according to claim 1; and
an electric power generator configured to generate electric power by a rotary force supplied from an output shaft of an internal combustion engine of a motor vehicle.

* * * * *